United States Patent
Yang et al.

(10) Patent No.: US 11,706,433 B2
(45) Date of Patent: *Jul. 18, 2023

(54) ENCODING METHOD AND APPARATUS THEREFOR, AND DECODING METHOD AND APPARATUS THEREFOR

(71) Applicant: SAMSUNG ELECTRONICS CO., LTD., Suwon-si (KR)

(72) Inventors: Heechul Yang, Suwon-si (KR); Minsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,174

(22) Filed: Apr. 3, 2022

(65) Prior Publication Data
US 2022/0224929 A1 Jul. 14, 2022

Related U.S. Application Data

(63) Continuation of application No. 16/913,583, filed on Jun. 26, 2020, now Pat. No. 11,438,614, which is a
(Continued)

(51) Int. Cl.
*H04N 19/44* (2014.01)
*H04N 19/124* (2014.01)
(Continued)

(52) U.S. Cl.
CPC .......... *H04N 19/44* (2014.11); *H04N 19/124* (2014.11); *H04N 19/176* (2014.11); *H04N 19/46* (2014.11); *H04N 19/96* (2014.11)

(58) Field of Classification Search
CPC .... H04N 19/44; H04N 19/124; H04N 19/176; H04N 19/46; H04N 19/96
See application file for complete search history.

(56) References Cited

U.S. PATENT DOCUMENTS 9,066,098 B2   6/2015  Sim et al.
9,832,460 B2  11/2017  Kobayashi
(Continued)

FOREIGN PATENT DOCUMENTS

CN    103380620 A    10/2013
CN    104094600 A    10/2014
(Continued)

OTHER PUBLICATIONS

Communication dated Jun. 3, 2022, issued by the IP Australia in counterpart Australian Application No. 2019205693.
(Continued)

*Primary Examiner* — Fabio S Lima
(74) *Attorney, Agent, or Firm* — Sughrue Mion, PLLC

(57) ABSTRACT

Provided is an image decoding method including determining a predicted quantization parameter of a current quantization group determined according to at least one of block split information and block size information, determining a difference quantization parameter of the current quantization group, determining a quantization parameter of the current quantization group, based on the predicted quantization parameter and the difference quantization parameter of the current quantization group, and inverse quantizing a current block included in the current quantization group, according to the quantization parameter of the current quantization group.

4 Claims, 31 Drawing Sheets

Related U.S. Application Data continuation of application No. PCT/KR2019/000041, filed on Jan. 2, 2019.

(60) Provisional application No. 62/628,410, filed on Feb. 9, 2018, provisional application No. 62/612,770, filed on Jan. 2, 2018.

(51) Int. Cl.
*H04N 19/176* (2014.01)
*H04N 19/46* (2014.01)
*H04N 19/96* (2014.01)

(56) References Cited

U.S. PATENT DOCUMENTS

| | | | |
|---|---|---|---|
| 9,912,950 B2 | 3/2018 | Oh et al. | |
| 9,918,089 B2 | 3/2018 | Kobayashi | |
| 10,244,251 B1 | 3/2019 | Fukushima et al. | |
| 10,750,177 B2 | 8/2020 | Kobayashi | |
| 2013/0101025 A1* | 4/2013 | Van der Auwera | H04N 19/117 375/240.03 |
| 2014/0112593 A1 | 4/2014 | Zheng et al. | |
| 2014/0161177 A1 | 6/2014 | Sim et al. | |
| 2014/0286403 A1* | 9/2014 | Nishitani | H04N 19/176 375/240.03 |
| 2014/0301449 A1 | 10/2014 | Oh et al. | |
| 2014/0341276 A1* | 11/2014 | Lee | H04N 19/436 375/240.03 |
| 2015/0365671 A1 | 12/2015 | Pu et al. | |
| 2016/0353105 A1 | 12/2016 | Kobayashi | |
| 2017/0347096 A1* | 11/2017 | Hong | H04N 19/119 |
| 2018/0020241 A1* | 1/2018 | Li | H04N 19/18 |
| 2018/0199072 A1* | 7/2018 | Li | H04N 19/186 |
| 2019/0082179 A1* | 3/2019 | Ahn | H04N 19/176 |
| 2019/0098338 A1 | 3/2019 | Ikai et al. | |
| 2019/0149828 A1* | 5/2019 | Jeong | H04N 19/176 375/240.12 |
| 2019/0182498 A1* | 6/2019 | Yamamoto | H04N 19/96 |
| 2019/0273923 A1* | 9/2019 | Huang | H04N 19/96 |
| 2019/0289306 A1* | 9/2019 | Zhao | H04N 19/61 |
| 2019/0349587 A1* | 11/2019 | Jang | H04N 19/186 |
| 2019/0364280 A1 | 11/2019 | Kobayashi | |
| 2019/0379914 A1* | 12/2019 | Misra | H04N 19/186 |
| 2019/0387253 A1* | 12/2019 | Misra | H04N 19/119 |
| 2020/0137424 A1* | 4/2020 | Zhao | H04N 19/176 |

FOREIGN PATENT DOCUMENTS

| | | |
|---|---|---|
| EP | 3614669 A1 | 2/2020 |
| EP | 3448029 B1 | 10/2021 |
| JP | 2013-223097 A | 10/2013 |
| JP | 2016-181931 A | 10/2016 |
| JP | 2016-192794 A | 11/2016 |
| JP | 2017-103723 A | 6/2017 |
| JP | 2017-521920 A | 8/2017 |
| KR | 10-2014-0074350 A | 6/2014 |
| KR | 10-1442127 B1 | 9/2014 |
| RU | 2 551 801 C2 | 5/2015 |
| RU | 2607998 C9 | 1/2017 |
| WO | 2015/191838 A1 | 12/2015 |
| WO | 2015/194669 A1 | 12/2015 |
| WO | 2017/203930 A1 | 11/2017 |

OTHER PUBLICATIONS

Communication dated Apr. 26, 2022, issued by the India Intellectual Property Office in Indian Patent Application No. 202027025870.
Communication dated May 31, 2022, issued by the India Intellectual Property Office in Indian Patent Application No. 202228005432.
Communication dated Jun. 27, 2022, issued by the India Intellectual Property Office in Indian Patent Application No. 202228005411.
Communication dated May 27, 2022, issued by the India Intellectual Property Office in Indian Patent Application No. 202228005403.
International Search Report and Written Opinion (PCT/ISA/210 and PCT/ISA/237), dated Apr. 12, 2019 by International Searching Authority in International Application No. PCT/KR2019/000041.
Communication dated May 14, 2020, issued by the Korean Intellectual Property Office in corresponding Korean Application No. 10-2020-7007865.
Communication dated Apr. 26, 2021 by the Korean Intellectual Property Office in counterpart Korean Patent Application No. 10-2020-7034052.
Communication dated May 10, 2021 by the European patent Office in counterpart European Patent Application No. 19735775.9.
Muhammed Coban et al., "CE4 Subtest 2: QP prediction from spatially neighboring CU's (test 2.3.b, 2.3.c)", Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F332, XP030009355. (6 pages total).
Gao (Huawei) W. et al., "AHG19: A lossless coding solution for HEVC", 8th JCT-VC Meeting, Feb. 1-10, 2012, San Jose, (Joint Collabarative Team on Video Coding of ISO/IEC JTC1/SC29/WG11 and ITU-T SG.16), n. JCTVC-H0530, Feb. 4, 2012, XP030232504. (24 pages total).
Communication dated Jan. 11, 2021 issued by the State Intellectual Property Office of the P.R.China in application No. 201980007205.3.
Communication dated Nov. 15, 2021 issued by the Russian Patent Office in application No. 2020125153/07.
Communication dated Feb. 15, 2022 by the Korean Intellectual Property Office in counterpart Korean Patent Application No. 10-2022-7002861.
Communication dated Feb. 16, 2022 by the Korean Intellectual Property Office in counterpart Korean Patent Application No. 10-2022-7002862.
Communication dated Feb. 17, 2022 by the Korean Intellectual Property Office in counterpart Korean Patent Application No. 10-2022-7002863.
Communication issued Jan. 4, 2023 by the Japanese Patent Office in counterpart Japanese Patent application No. 2020-535588.
Communication issued Feb. 14, 2023 by the Russian Patent Office in counterpart Russian Patent Application No. 2022127941.

* cited by examiner

FIG. 3
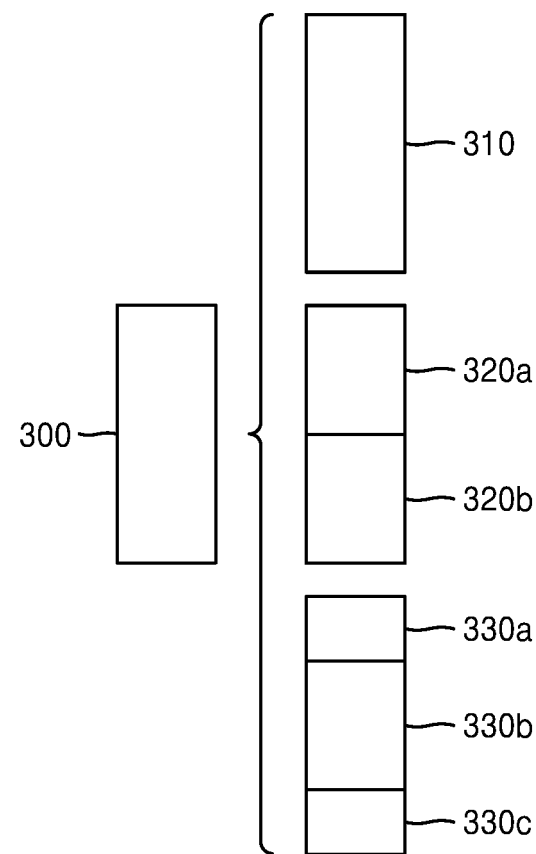
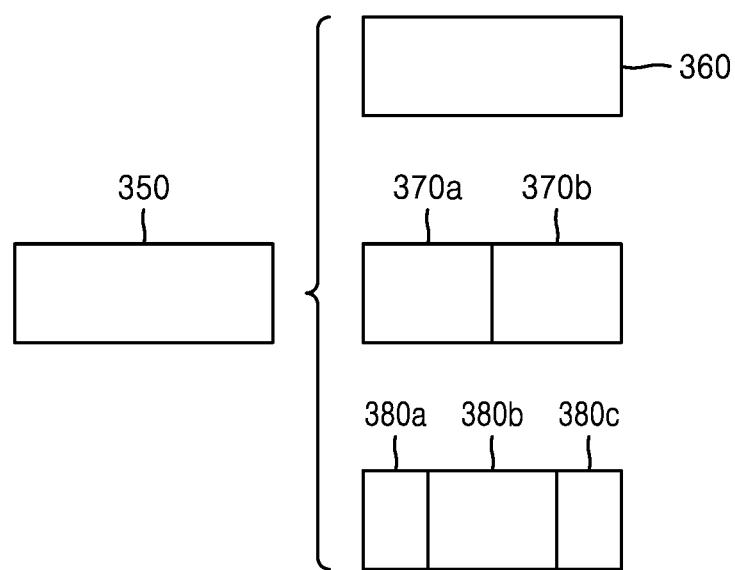

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

FIG. 19

| coding_quadtree( x0, y0, log2CbSize, cqtDepth, treeType ) { | Descriptor |
|---|---|
| ...... | |
| if( cu_qp_delta_enabled_flag && cqtDepth <= diff_cu_qp_delta_depth ) { | |
|   IsCuQpDeltaCoded = 0 | |
|   CuQpDeltaVal = 0 | |
|   CuQgTopLeftX = x0 | |
|   CuQgTopLeftY = y0 | |
| } | |
| ...... | |

| multi_type_tree( x0, y0, cbWidth, cbHeight, cqtDepth, mttDepth, depthOffset, partIdx, treeType ) { | Descriptor |
|---|---|
| ...... | ae(v) |
| if( cu_qp_delta_enabled_flag && ( cqtDepth + mttDepth ) <= diff_cu_qp_delta_depth ) { | |
|   IsCuQpDeltaCoded = 0 | |
|   CuQpDeltaVal = 0 | |
|   CuQgTopLeftX = x0 | |
|   CuQgTopLeftY = y0 | |
| } | |
| ...... | |

| transform_unit( x0, y0, tbWidth, tbHeight, treeType ) { | Descriptor |
|---|---|
| ...... | |
| if( ( tu_cbf_luma[ x0 ][ y0 ] | | tu_cbf_cb[ x0 ][ y0 ] | | tu_cbf_cr[ x0 ][ y0 ] ) ) { | |
|   if( cu_qp_delta_enabled_flag && !IsCuQpDeltaCoded ) { | |
|     cu_qp_delta_abs | ae(v) |
|     if( cu_qp_delta_abs ) | |
|     cu_qp_delta_sign_flag | ae(v) |
|   } | |
| } | |
| ...... | |

ENCODING METHOD AND APPARATUS THEREFOR, AND DECODING METHOD AND APPARATUS THEREFOR

CROSS-REFERENCE TO RELATED APPLICATIONS

This application is a continuation application of U.S. patent application Ser. No. 16/913,583, filed on Jun. 26, 2020, which is a continuation of International Application No. PCT/KR2019/000041, filed on Jan. 2, 2019, which claims priority from U.S. Provisional Application No. 62/612,770, filed Jan. 2, 2018 and U.S. Provisional Application No. 62/628,410, filed on Feb. 9, 2018, the contents of all of which are incorporated herein by reference in their entirety.

TECHNICAL FIELD

The disclosure relates to an image encoding method and decoding method, and more particularly, to a method of efficiently encoding and decoding information about a motion vector.

BACKGROUND ART

When an image of high quality is encoded, a large amount of data is required However, because a bandwidth available for transmission of the image data is limited, a data rate applied to transmission of the image data may be limited. Therefore, for efficient transmission of image data, there is a need for image data encoding and decoding methods with minimal deterioration in image quality and increased compression rates.

Image data may be compressed by removing spatial redundancies and temporal redundancies between pixels. Because neighboring pixels generally have common characteristics, encoding information of a data unit consisting of pixels is transmitted to remove redundancies between the neighboring pixels.

Pixel values of the pixels included in the data unit are not directly transmitted but information about a method of obtaining the pixel values is transmitted. A prediction method, in which a pixel value that is similar to an original value is predicted, is determined for each data unit, and encoding information about the prediction method is transmitted from an encoder to a decoder. Because a prediction value is not completely equal to the original value, residual data of a difference between the original value and the prediction value is transmitted from the encoder to the decoder.

When prediction is exact, a size of the encoding information for specifying the prediction method is increased but a size of the residual data is decreased. Therefore, the prediction method is determined, in consideration of sizes of the encoding information and the residual data. In particular, a data unit that is split from a picture has various sizes, and in this regard, when a size of the data unit is increased, there is an increased probability that accuracy of prediction is decreased, whereas the size of encoding information is decrease. Thus, a size of a block is determined according to characteristics of a picture.

The prediction method includes intra prediction and inter prediction. The intra prediction is a method of predicting pixels of a block from pixels adjacent to the block. The inter prediction is a method of predicting pixels by referring to pixels of a different picture referred to for a picture including the block. Therefore, spatial redundancy is removed by the intra prediction, and temporal redundancy is removed by the inter prediction.

When the number of prediction methods is increased, an amount of encoding information for indicating the prediction method is increased. Thus, the amount of the encoding information may be decreased by predicting, from a different block, the encoding information to be applied to a block.

Because loss of image data is allowed to the extent that the human eye cannot recognize the loss, residual data may be lossy-compressed according to transformation and quantization processes, and by doing so, an amount of the residual data may be decreased.

DESCRIPTION OF EMBODIMENTS

Technical Problem

Provided are an image encoding method and an image encoding apparatus for determining a quantization parameter of a quantization group, based on block split information and block size information. Provided are an image decoding method and an image decoding apparatus for determining a quantization parameter of a quantization group, based on block split information and block size information.

Provided are an image encoding method and an image encoding apparatus for matching a current block with a current quantization parameter unit, based on at least one of a position and a size of the current block. Provided are an image decoding method and an image decoding apparatus for matching a current block with a current quantization parameter unit, based on at least one of a position and a size of the current block.

In addition, provided is a computer-readable recording medium having recorded thereon a program for executing, on a computer, the image encoding method and the image decoding method according to an embodiment of the disclosure.

Solution to Problem

Provided is an image decoding method including: determining a predicted quantization parameter of a current quantization group determined according to at least one of block split information and block size information; determining a difference quantization parameter of the current quantization group; determining a quantization parameter of the current quantization group, based on the predicted quantization parameter and the difference quantization parameter of the current quantization group; and inverse quantizing a current block included in the current quantization group, according to the quantization parameter of the current quantization group.

Provided is an image decoding apparatus including a processor configured to determine a predicted quantization parameter of a current quantization group determined according to at least one of block split information and block size information, determine a difference quantization parameter of the current quantization group, determine a quantization parameter of the current quantization group, based on the predicted quantization parameter and the difference quantization parameter of the current quantization group, and inverse quantize a current block included in the current quantization group, according to the quantization parameter of the current quantization group.

Provided is an image decoding method including: matching a current block to a current quantization parameter unit, based on at least one of a position and a size of the current block; obtaining a predicted quantization parameter with respect to the current quantization parameter unit; obtaining a difference quantization parameter with respect to the current quantization parameter unit; determining a quantization parameter of the current quantization parameter unit, based on the predicted quantization parameter and the difference quantization parameter; and inverse quantizing the current block according to the quantization parameter of the current quantization parameter unit.

Provided is an image decoding apparatus including a processor configured to match a current block to a current quantization parameter unit, based on at least one of a position and a size of the current block, obtain a predicted quantization parameter with respect to the current quantization parameter unit, obtain a difference quantization parameter with respect to the current quantization parameter unit, determine a quantization parameter of the current quantization parameter unit, based on the predicted quantization parameter and the difference quantization parameter, and inverse quantize the current block according to the quantization parameter of the current quantization parameter unit.

Provided is a computer-readable recording medium having recorded thereon a program for performing the image encoding method and the image decoding method.

The technical problems to be achieved by the disclosure are not limited to the technical features described above, and other technical problems may be inferred from embodiments below.

Advantageous Effects of Disclosure

A quantization parameter of blocks is determined according to a quantization group or a quantization parameter unit, such that information necessary for determining a quantization parameter may be efficiently compressed.

BRIEF DESCRIPTION OF DRAWINGS

FIG. 3 illustrates a process of determining at least one coding unit by splitting a non-square coding unit, according to an embodiment

FIG. 12 illustrates a process of determining a depth of a coding unit as a shape and size of the coding unit change, when the coding unit is recursively split such that a plurality of coding units are determined, according to an embodiment.

FIG. 19 illustrates a syntax structure about a method of decoding a difference quantization parameter included in a bitstream when quadtree split and non-quadtree split are all allowed.

BEST MODE

Figure 1A:
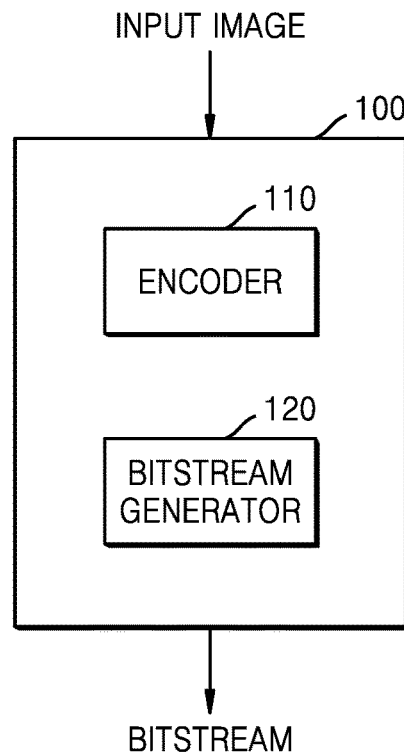
FIG. 1A is a block diagram of an image encoding apparatus based on coding units according to a tree structure, according to an embodiment of the disclosure.

Provided is an image decoding method including: determining a predicted quantization parameter of a current quantization group determined according to at least one of block split information and block size information; determining a difference quantization parameter of the current quantization group; determining a quantization parameter of the current quantization group, based on the predicted quantization parameter and the difference quantization parameter of the current quantization group; and inverse quantizing a current block included in the current quantization group, according to the quantization parameter of the current quantization group. Also, provided is an image decoding apparatus including a process for performing the image decoding method.

Provided is an image decoding method including: matching a current block to a current quantization parameter unit, based on at least one of a position and a size of the current block; obtaining a predicted quantization parameter with respect to the current quantization parameter unit; obtaining a difference quantization parameter with respect to the current quantization parameter unit; determining a quantization parameter of the current quantization parameter unit, based on the predicted quantization parameter and the difference quantization parameter; and inverse quantizing the current block according to the quantization parameter of the current quantization parameter unit. Also, provided is an image decoding apparatus including a process for performing the image decoding method.

Mode of Disclosure

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements. In the following descriptions, terms such as "unit" indicate software or a hardware component such as a field programmable gate array (FPGA) or an application specific semiconductor (ASIC), and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

The term "current block" indicates one of a current coding unit to be encoded or decoded, a prediction unit, and a transform unit. For convenience of description, when it is required to distinguish between other types of blocks such as a prediction unit, a transform unit, or the like, the terms "current coding block", "current prediction block", "current transform block" may be used. Also, a "lower block" denotes a data unit split from a "current block". An "upper block" denotes a data unit including a "current block".

Hereinafter, a "sample" denotes data assigned to a sampling position of an image, i.e., data to be processed. For example, pixel values of an image in a spatial domain and transform coefficients on a transform domain may be samples. A unit including at least one such sample may be defined as a block.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

FIG. 1A is a block diagram of an image encoding apparatus 100 based on coding units according to a tree structure, according to an embodiment of the disclosure.

The image encoding apparatus 100 may include an encoder 110 and a bitstream generator 120.

The encoder 110 splits a picture or a slice included in the picture into a plurality of largest coding units according to sizes of the largest coding units. The largest coding units may be data units having a size of 32×32, 64×64, 128×128, 256×256 or the like, and may each be a square data unit having a width and length in powers of 2. The encoder 110 may provide the bitstream generator 120 with largest coding unit size information indicating a size of a largest coding unit. The bitstream generator 120 may add the largest coding unit size information to a bitstream.

The encoder 110 determines coding units by splitting the largest coding unit. Whether to split a coding unit is determined according to whether it is efficient to split the coding unit by rate-distortion optimization. In addition, split information indicating whether the coding unit is split may be generated. The split information may be represented in the form of a flag.

A coding unit may be split in various ways. For example, a square coding unit may be split into four square coding units, the width and height of which are half those of the square coding unit. The square coding unit may be split into two rectangular coding units having a width half that of the square coding unit. The square coding unit may be split into two rectangular coding units having a height half that of the square coding unit. The square coding unit may be split into three coding units by splitting the width or height thereof into a ratio of 1:2:1.

A rectangular coding unit having a width twice a height thereof may be split into two square coding units. A rectangular coding unit having a width twice a height thereof may be split into two square coding units having a width four times a height thereof. A rectangular coding unit having a width twice a height thereof may be split into two rectangular coding units and one square coding unit by splitting the width of the rectangular coding unit into a ratio of 1:2:1.

Equally, a rectangular coding unit having a height twice a width thereof may be split into two square coding units. A rectangular coding unit having a height twice a width thereof may be split into two rectangular coding units having a height four times a width thereof. Equally a rectangular coding unit having a height twice a width thereof may be split into two rectangular coding units and one square coding unit by splitting the height of the rectangular coding unit into a ratio of 1:2:1.

When two or more splitting methods are applicable to the image encoding apparatus 100, information about a splitting method applicable to a coding unit among the splitting methods applicable to the image encoding apparatus 100 may be determined for each picture. Thus, only specific splitting methods may be determined to be used for each picture. When the image encoding apparatus 100 employs only one splitting method, information about a splitting method applicable to a coding unit is not additionally determined.

A coding unit of a particular size may be split by using a particular splitting method. For example, when a size of the coding unit is 256×265, the coding unit may be set to be split into only four square coding units whose width and height are half the coding unit.

When split information of a coding unit indicates that the coding unit is to be split, split shape information indicating a splitting method of the coding unit may be generated. When there is only one splitting method applicable to a picture to which the coding unit belongs, the split shape information may not be generated. When a splitting method is adaptively determined based on encoding information about the vicinity of the coding unit, the split shape information may not be generated.

As described above, image data of a current picture is split into largest coding units according to a maximum size of the coding unit. The largest coding unit may include coding units that are hierarchically split from a largest coding unit. A shape and a position of a lower coding unit may be determined based on a split shape of an upper coding unit. A minimum size of a coding unit which limits split of a coding unit may be preset.

The encoder 110 compares coding efficiency when the coding unit is hierarchically split from coding efficiency when the coding unit is not split. Then, the encoder 110 determines whether to split the coding unit, according to a result of the comparison. When it is determined that it is more efficient to split the coding unit, the encoder 110 hierarchically splits the coding unit. The coding unit is not split when the result of comparison reveals that it is efficient not to split the coding unit. Whether to split the coding unit may be determined independently of whether to split other coding units adjacent to the coding unit.

A coding unit that is split last may be predicted due to inter prediction or inter prediction. Intra prediction is a method of predicting samples of a prediction unit by using reference samples around the prediction unit. Inter prediction is a method of predicting samples of a prediction unit by obtaining a reference sample from a reference picture referenced for a current picture.

For intra prediction, the encoder 110 may select a most efficient intra prediction method by applying a plurality of intra prediction methods to a prediction unit. Intra prediction methods include a DC mode, a planar mode, a directional mode such as a vertical mode and a horizontal mode, or the like.

Intra prediction may be performed for each prediction unit when a reconstructed sample around a coding unit is used as a reference sample. However, when a reconstructed sample in the coding unit is used as a reference sample, a reference sample in the coding unit should be first reconstructed and thus a prediction order of a prediction unit may be subordinate to a transformation order of a transform unit. Therefore, when the reconstructed sample in the coding unit is used as a reference sample, only an intra prediction method for transform units corresponding to the prediction unit is determined for the prediction unit and intra prediction may be performed substantially for each transform unit.

The encoder 110 may select a most efficient inter prediction method by determining an optimal motion vector and a reference picture. For inter prediction, the encoder 110 may determine a plurality of motion vector candidates among coding units spatially and temporally neighboring to a current coding unit, and determine a most efficient motion vector as a motion vector among the plurality of motion vector candidates. Equally, a plurality of reference picture candidates may be determined among the coding units spatially and temporally neighboring to the current coding unit, and a most efficient reference picture may be determined among the plurality of reference picture candidates. In an embodiment, a reference picture may be determined from a reference picture list determined in advance for a current picture. In an embodiment, for accurate prediction, a most efficient motion vector among a plurality of motion vector candidates may be determined as a predicted motion vector and a motion vector may be determined by correcting the predicted motion vector. Inter prediction may be parallel performed for each prediction unit included in a coding unit.

The encoder 110 may reconstruct a coding unit by obtaining only information representing a motion vector and a reference picture according to a skip mode. According to the skip mode, all encoding information including a residual signal is omitted except for the information representing the motion vector and the reference picture. Because the residual signal is omitted, the skip mode is applicable when the accuracy of prediction is very high.

The partition mode to be used may be limited according to a prediction method for a prediction unit. For example, only a partition mode for prediction units having sizes of 2N×2N and N×N may be applied to intra prediction, while a partition mode for prediction units having sizes of 2N×2N, 2N×N, N×2N and N×N may be applied to inter prediction. In addition, only a partition mode for a prediction unit having a size of 2N×2N may be applied to a skip mode of inter prediction. A partition mode allowed for each prediction method in the image encoding apparatus 100 may be changed according to coding efficiency.

The image encoding apparatus 100 may perform transformation based on a coding unit. The image encoding apparatus 100 may transform residual data, which are the differences between original values of pixels included in a coding unit and prediction values thereof, by a preset process. For example, the image encoding apparatus 100 may perform lossy compression on the residual data by quantization and discrete cosine transform (DCT)/discrete sine transform (DST) transformation. Alternatively, the image encoding apparatus 100 may perform lossless compression on the residual data without quantization.

In conclusion, the encoder 110 determines the most efficient prediction method for a current coding unit from among a plurality of intra prediction methods and inter prediction methods. Then, the encoder 110 determines a prediction method of the current coding unit, based on coding efficiency according to a result of the prediction. Equally, the encoder 110 may determine a transformation method based on coding efficiency according to a result of the transformation. Based on the most efficient prediction method and transformation method determining scheme with respect to a coding unit, coding efficiency of the coding unit is finally determined. The encoder 110 determines a hierarchical structure of a largest coding unit according to coding efficiency of a finally-split coding unit.

The encoder 110 may measure coding efficiency of coding units, prediction efficiency of prediction methods, etc. by using a Lagrangian multiplier-based rate-distortion optimization technique.

The encoder 110 may generate split information indicating whether a coding unit is split, based on the determined hierarchical structure of the largest coding unit. The encoder 110 may generate partition mode information for determining a prediction unit and transform unit split information for determining a transform unit with respect to a split coding unit. When there are two or more splitting methods of a coding unit, the encoder 110 may generate split shape information indicating a splitting method, together with split information. Then, the encoder 110 may generate information about a prediction method and a transformation method used for a prediction unit and a transform unit.

The bitstream generator 120 may output information generated by the encoder 110 in the form of a bitstream based on a hierarchical structure of a largest coding unit.

A method of determining a coding unit, a prediction unit, and a transform unit according to a tree structure of a largest coding unit according to an embodiment will be described in detail with reference to FIGS. 3 to 12 below.

Figure 1B:
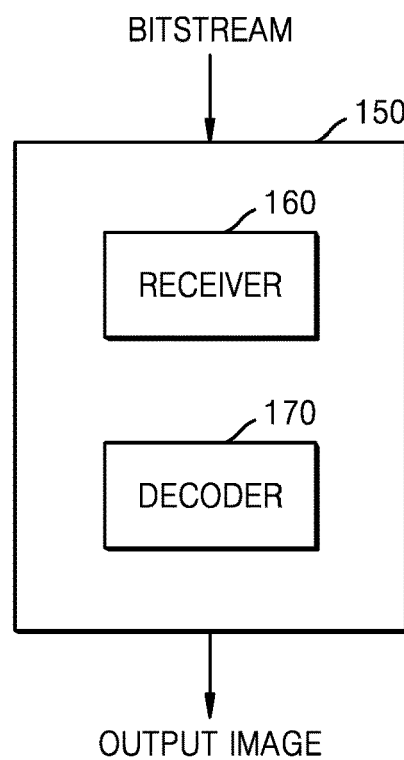
FIG. 1B is a block diagram of an image decoding apparatus based on coding units of a tree structure, according to an embodiment.

FIG. 1B is a block diagram of an image decoding apparatus 150 based on coding units of a tree structure, according to an embodiment.

The image decoding apparatus 150 includes a receiver 160 and a decoder 170.

Various terms such as "coding unit", "prediction unit", "transform unit", and various "split information" related to a decoding operation of the image decoding apparatus 150 according to an embodiment are as described above with reference to FIG. 1 and the image encoding apparatus 100. In addition, the image decoding apparatus 150 is configured to restore image data and thus various encoding methods used in the image encoding apparatus 100 are applicable to the image decoding apparatus 150.

The receiver 160 receives and parses a bitstream of an encoded image. The receiver 160 extracts information necessary to decode each largest coding unit from the parsed bitstream and provides the information to the decoder 170. The receiver 160 may extract information about a maximum size of a coding unit of a current picture from a header, a sequence parameter set, or a picture parameter set for the current picture.

The receiver 160 extracts, from the parsed bitstream, split information of coding units of a tree structure for each largest coding unit. The extracted split information is output to the decoder 170. The decoder 170 may determine a tree structure of a largest coding unit by splitting the largest coding unit according to the extracted split information.

The split information extracted by the decoder 170 is split information of a tree structure determined by the image encoding apparatus 100 to generate a minimum encoding error. Therefore, the image decoding apparatus 150 may reconstruct an image by decoding data according to an encoding method that generates the minimum encoding error.

The decoder 170 may extract split information about a data unit such as a prediction unit and a transform unit included in a coding unit. For example, the decoder 170 may extract information about a most efficient partition mode for a prediction unit. The decoder 170 may extract transform partition information of a tree structure that is most efficient in a transform unit.

The decoder 170 may obtain information about a prediction method that is most efficient in prediction units split from a coding unit. The decoder 170 may obtain information about a transformation method that is most efficient in transform units split from a coding unit.

The decoder 170 extracts information from the bitstream according to a method of configuring the bitstream by the bitstream generator 120 of the image encoding apparatus 100.

The decoder 170 may split a largest coding unit into coding units of a most efficient tree structure, based on the split information. The decoder 170 may split a coding unit into prediction units according to information about a partition mode. The decoder 170 may split the coding unit into transform units according to the transform split information.

The decoder 170 may predict a prediction unit according to information about a prediction method. The decoder 170 may perform inverse quantization and inverse transformation on residual data corresponding to the difference between an original value and a prediction value of a pixel, based on information about a method of transforming a transform unit. In addition, the decoder 170 may reconstruct pixels of a coding unit according to a result of predicting a prediction unit and a result of transforming a transform unit.

Figure 2:
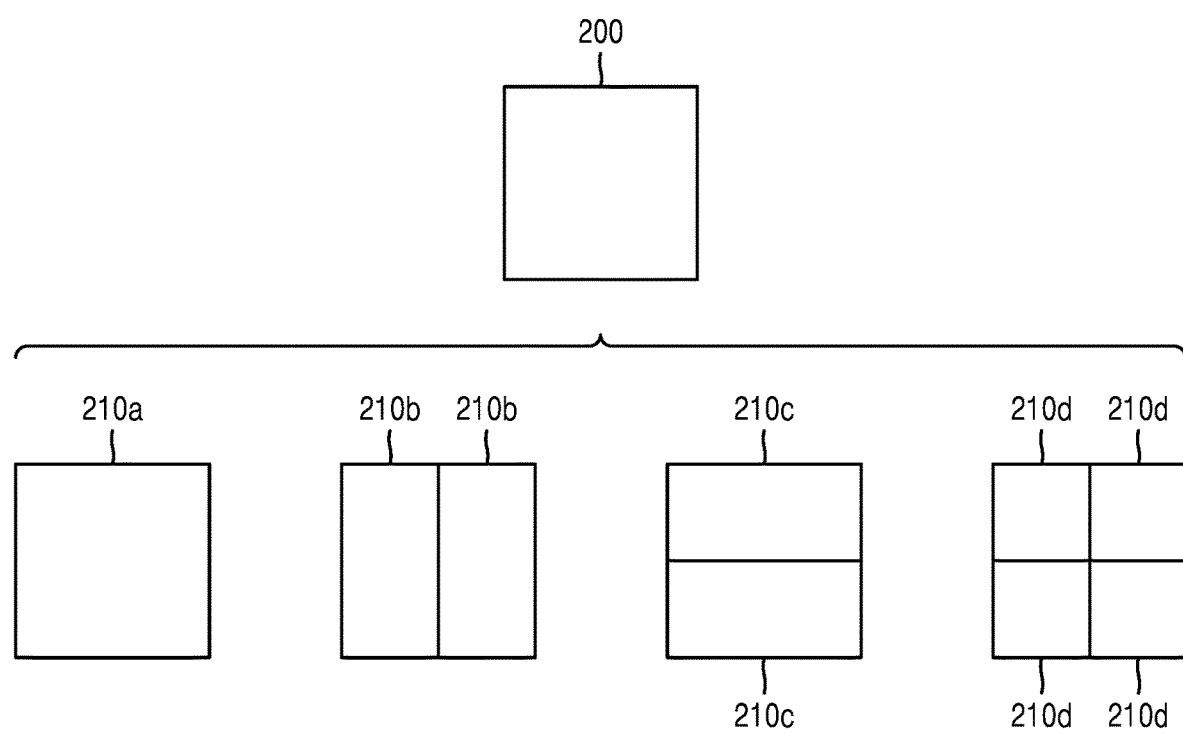
FIG. 2 illustrates a process by which the image decoding apparatus determines at least one coding unit by splitting a current coding unit, according to an embodiment.

FIG. 2 illustrates a process by which the image decoding apparatus 150 determines at least one coding unit by splitting a current coding unit, according to an embodiment.

According to an embodiment, the image decoding apparatus 150 may determine a shape of a coding unit by using block shape information and may determine a shape into which the coding unit is to be split by using split shape information. That is, a method of splitting a coding unit, the method being indicated by the split type information, may be determined based on a block shape indicated by the block shape information employed by the image decoding apparatus 150.

According to an embodiment, the image decoding apparatus 150 may use the block shape information indicating that the current coding unit has a square shape. For example, the image decoding apparatus 150 may determine whether not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, the decoder 180 may determine that a coding unit 210*a* having the same size as the current coding unit 200 is not split, based on the split shape information indicating not to perform splitting, or may determine coding units 210*b*, 210*c*, or 210*d* split based on the split shape information indicating a preset splitting method.

Referring to FIG. 2, according to an embodiment, the image decoding apparatus 150 may determine two coding units 210*b* obtained by splitting the current coding unit 200 in a vertical direction, based on the split shape information indicating to perform splitting in a vertical direction. The image decoding apparatus 150 may determine two coding units 210c obtained by splitting the current coding unit 200 in a horizontal direction, based on the split shape information indicating to perform splitting in a horizontal direction. The image decoding apparatus 150 may determine four coding units 210d obtained by splitting the current coding unit 200 in vertical and horizontal directions, based on the split shape information indicating to perform splitting in vertical and horizontal directions. However, splitting methods of the square coding unit are not limited to the above-described methods, and the split shape information may indicate various methods. Preset split shapes by which the square coding unit is to be split will be described in detail below in relation to various embodiments.

FIG. 3 illustrates a process, performed by the image decoding apparatus 150, of determining at least one coding unit by splitting a non-square coding unit, according to an embodiment.

According to an embodiment, the image decoding apparatus 150 may use block shape information indicating that a current coding unit has a non-square shape. The image decoding apparatus 150 may determine whether not to split the non-square current coding unit or whether to split the non-square current coding unit by using a preset splitting method, based on split shape information. Referring to FIG. 3, when the block shape information of a current coding unit 300 or 350 indicates a non-square shape, the image decoding apparatus 150 may determine that a coding unit 310 or 360 having the same size as the current coding unit 300 or 350 is not split, based on the split shape information indicating not to perform splitting, or determine coding units 320a and 320b, 330a to 330c, 370a and 370b, or 380a to 380c split based on the split shape information indicating a preset splitting method. Preset splitting methods of splitting a non-square coding unit will be described in detail below in relation to various embodiments.

According to an embodiment, the image decoding apparatus 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the image decoding apparatus 150 may determine two coding units 320a and 320b, or 370a and 370b included in the current coding unit 300 or 350, by splitting the current coding unit 300 or 350 based on the split shape information.

According to an embodiment, when the image decoding apparatus 150 splits the non-square current coding unit 300 or 350 based on the split shape information, the current coding unit may be split in consideration of a position of a long side of the non-square current coding unit 300 or 350. For example, the image decoding apparatus 150 may determine a plurality of coding units by dividing a long side of the current coding unit 300 or 350, in consideration of the shape of the current coding unit 300 or 350.

According to an embodiment, when the split shape information indicates to split a coding unit into an odd number of blocks, the image decoding apparatus 150 may determine an odd number of coding units included in the current coding unit 300 or 350. For example, when the split shape information indicates to split the current coding unit 300 or 350 into three coding units, the image decoding apparatus 150 may split the current coding unit 300 or 350 into three coding units 330a, 330b, and 330c, or 380a, 380b, and 380c. According to an embodiment, the image decoding apparatus 150 may determine an odd number of coding units included in the current coding unit 300 or 350, and not all the determined coding units may have the same size. For example, a preset coding unit 330b or 380b from among the determined odd number of coding units 330a, 330b, and 330c, or 380a, 380b, and 380c may have a size different from the size of the other coding units 330a and 330c, or 380a and 380c. That is, coding units which may be determined by splitting the current coding unit 300 or 350 may have multiple sizes and, in some cases, all of the odd number of coding units 330a, 330b, and 330c, or 380a, 380b, and 380c may have different sizes.

According to an embodiment, when the split shape information indicates to split a coding unit into an odd number of blocks, the image decoding apparatus 150 may determine an odd number of coding units included in the current coding unit 300 or 350, and may put a preset restriction on at least one coding unit from among the odd number of coding units generated by splitting the current coding unit 300 or 350. Referring to FIG. 3, the image decoding apparatus 150 may allow a decoding method of the coding unit 330b or 380b to be different from that of the other coding units 330a and 330c, or 380a and 380c, wherein the coding unit 330b or 380b is at a center position from among the three coding units 330a, 330b, and 330c, or 380a, 380b, and 380c generated by splitting the current coding unit 300 or 350. For example, the image decoding apparatus 150 may restrict the coding unit 330b or 380b at the center position to be no longer split or to be split only the preset number of times, unlike the other coding units 330a and 330c, or 380a and 380c.

Figure 4:
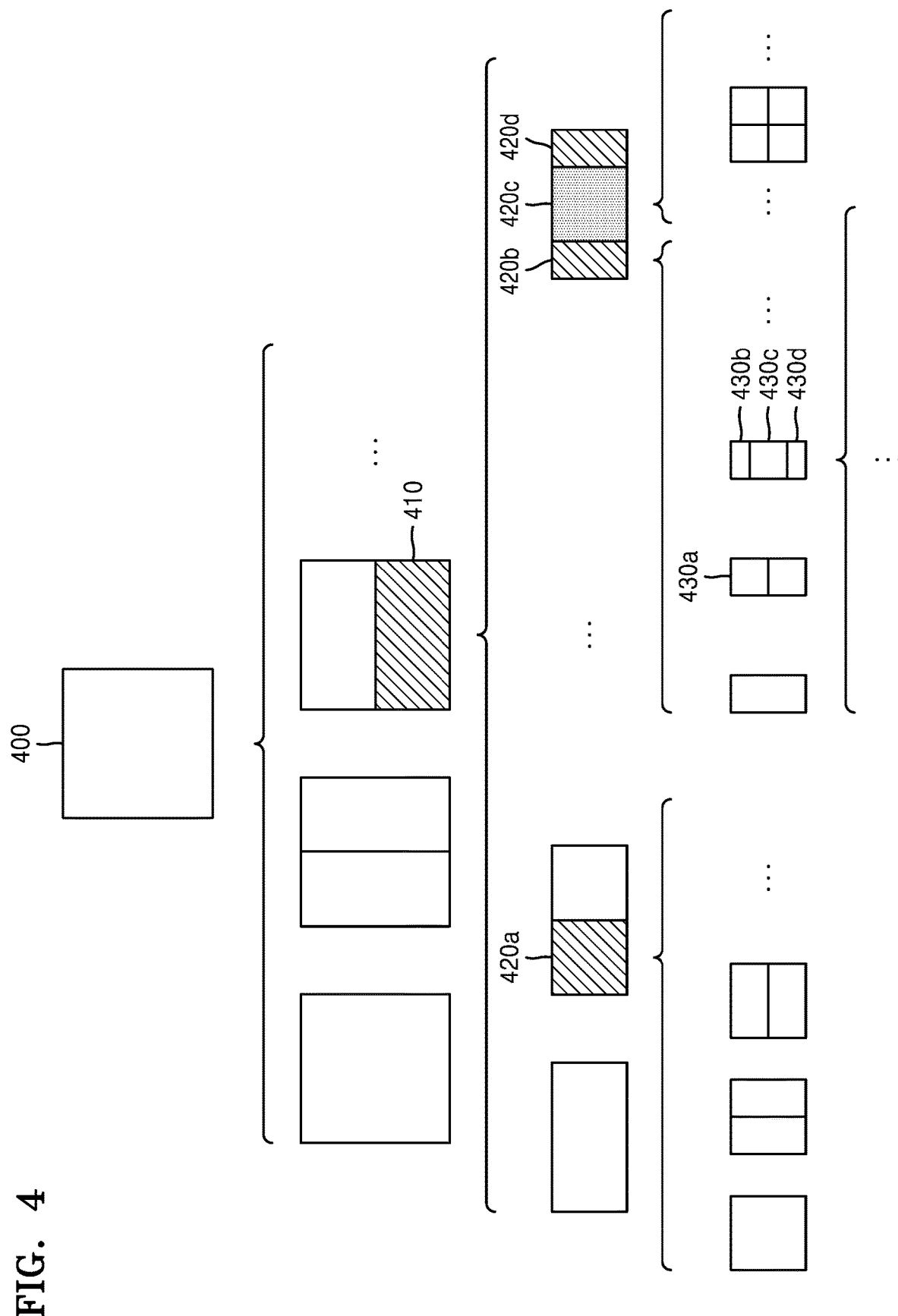
FIG. 4 illustrates a process of splitting a coding unit based on at least one of block shape information and split shape information, according to an embodiment.

FIG. 4 illustrates a process, performed by the image decoding apparatus 150, of splitting a coding unit based on at least one of block shape information and split shape information, according to an embodiment.

According to an embodiment, the image decoding apparatus 150 may determine to split or not to split a square first coding unit 400 into coding units, based on at least one of the block shape information and the split shape information. According to an embodiment, when the split shape information indicates to split the first coding unit 400 in a horizontal direction, the image decoding apparatus 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that a relation among the first coding unit, the second coding unit, and the third coding unit follows the above descriptions.

According to an embodiment, the image decoding apparatus 150 may determine to split or not to split the determined second coding unit 410 into coding units, based on at least one of the block shape information and the split shape information. Referring to FIG. 4, the image decoding apparatus 150 may or may not split the non-square second coding unit 410, which is determined by splitting the first coding unit 400, into one or more third coding units 420a, or 420b, 420c, and 420d based on at least one of the block shape information and the split shape information. The image decoding apparatus 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 410 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split a coding unit will be described below in relation to various embodiments.

According to an embodiment, the image decoding apparatus 150 may determine to split each of the third coding units 420a, or 420b, 420c, and 420d into coding units or not to split the second coding unit 410, based on at least one of the block shape information and the split shape information. According to an embodiment, the image decoding apparatus 150 may split the non-square second coding unit 410 into the odd number of third coding units 420b, 420c, and 420d. The image decoding apparatus 150 may put a preset restriction on a preset third coding unit from among the odd number of third coding units 420b, 420c, and 420d. For example, the image decoding apparatus 150 may restrict the third coding unit 420c at a center position from among the odd number of third coding units 420b, 420c, and 420d to be no longer split or to be split a settable number of times. Referring to FIG. 4, the image decoding apparatus 150 may restrict the third coding unit 420c, which is at the center position from among the odd number of third coding units 420b, 420c, and 420d included in the non-square second coding unit 410, to be no longer split, to be split by using a preset splitting method (e.g., split into only four coding units or split by using a splitting method of the second coding unit 410), or to be split only the preset number of times (e.g., split only n times (where n>0)). However, the restrictions on the third coding unit 420c at the center position are not limited to the above-described examples, and may include various restrictions for decoding the third coding unit 420c at the center position differently from the other third coding units 420b and 420d.

According to an embodiment, the image decoding apparatus 150 may obtain at least one of the block shape information and the split shape information, which is used to split a current coding unit, from a preset position in the current coding unit.

According to an embodiment, when the current coding unit is split into a preset number of coding units, the image decoding apparatus 150 may select one of the coding units. Various methods may be used to select one of a plurality of coding units, as will be described below in relation to various embodiments According to an embodiment, the image decoding apparatus 150 may split the current coding unit into a plurality of coding units, and may determine a coding unit at a preset position.

Figure 5:
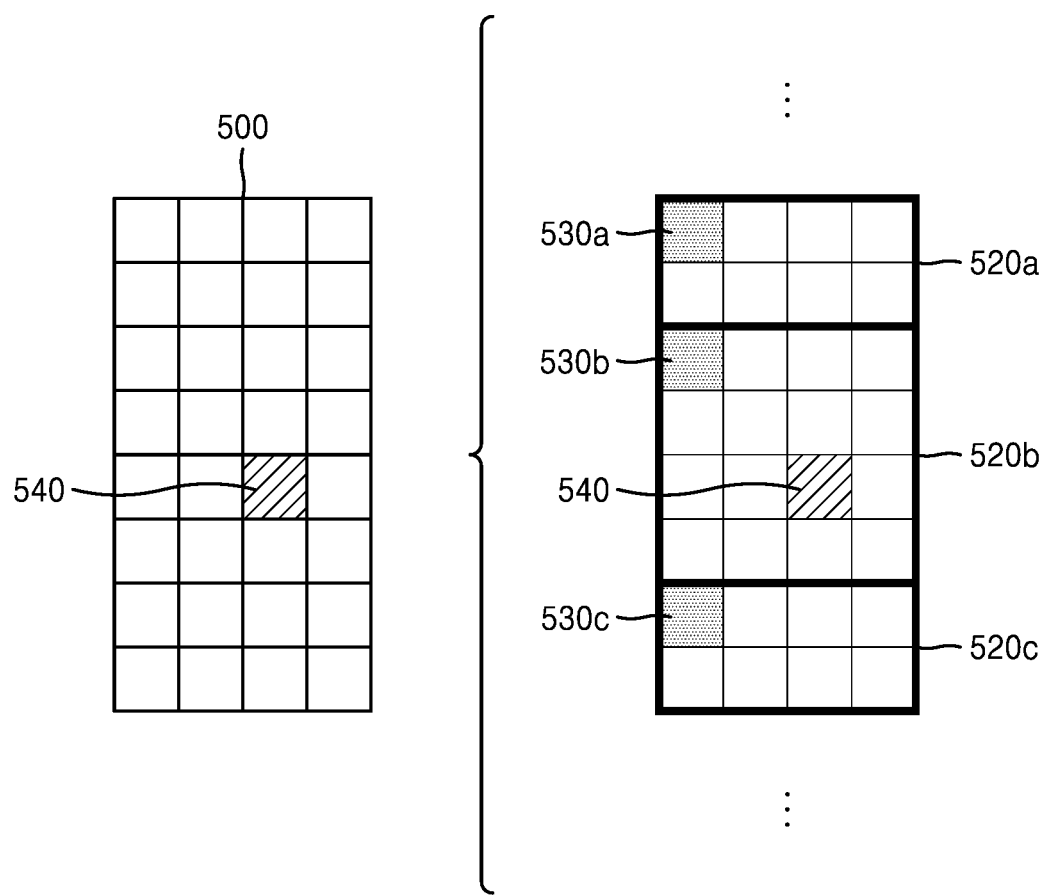
FIG. 5 illustrates a method of determining a preset coding unit from among an odd number of coding units, according to an embodiment.

FIG. 5 illustrates a method, performed by the image decoding apparatus 150, of determining a coding unit of a preset position from among an odd number of coding units, according to an embodiment According to an embodiment, the image decoding apparatus 150 may use information indicating positions of the odd number of coding units, to determine a coding unit at a center position from among the odd number of coding units. Referring to FIG. 5, the image decoding apparatus 150 may determine an odd number of coding units 520a, 520b, and 520c by splitting the current coding unit 500. The image decoding apparatus 150 may determine a coding unit 520b at a center position by using information about positions of the odd number of coding units 520a, 520b, and 520c. For example, the image decoding apparatus 150 may determine the coding unit 520b of the center position by determining the positions of the coding units 520a, 520b, and 520c based on information indicating positions of preset samples included in the coding units 520a, 520b, and 520c. In detail, the image decoding apparatus 150 may determine the coding unit 520b at the center position by determining the positions of the coding units 520a, 520b, and 520c based on information indicating positions of top left samples 530a, 530b, and 530c of the coding units 520a, 520b, and 520c.

According to an embodiment, the information indicating the positions of the top left samples 530a, 530b, and 530c, which are included in the coding units 520a, 520b, and 520c, respectively, may include information about positions or coordinates of the coding units 520a, 520b, and 520c in a picture. According to an embodiment, the information indicating the positions of the top left samples 530a, 530b, and 530c, which are included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding apparatus 150 may determine the coding unit 520b at the center position by directly using the information about the positions or coordinates of the coding units 520a, 520b, and 520c in the picture, or by using the information about the widths or heights of the coding units, which correspond to the difference values between the coordinates.

According to an embodiment, information indicating the position of the top left sample 530a of the upper coding unit 520a may include coordinates (xa, ya), information indicating the position of the top left sample 530b of the middle coding unit 520b may include coordinates (xb, yb), and information indicating the position of the top left sample 530c of the lower coding unit 520c may include coordinates (xc, yc). The image decoding apparatus 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center position may be determined as a coding unit at a center position from among the coding units 520a, 520b, and 520c determined by splitting the current coding unit 500. However, the coordinates indicating the positions of the top left samples 530a, 530b, and 530c may include coordinates indicating absolute positions in the picture, or may use coordinates (dxb, dyb) indicating a relative position of the top left sample 530b of the middle coding unit 520b and coordinates (dxc, dyc) indicating a relative position of the top left sample 530c of the lower coding unit 520c with reference to the position of the top left sample 530a of the upper coding unit 520a. A method of determining a coding unit at a preset position by using coordinates of a sample included in the coding unit, as information indicating a position of the sample, is not limited to the above-described method, and may include various arithmetic methods capable of using the coordinates of the sample.

According to an embodiment, the image decoding apparatus 150 may split the current coding unit 500 into a plurality of coding units 520a, 520b, and 520c, and may select one of the coding units 520a, 520b, and 520c based on a preset criterion. For example, the image decoding apparatus 150 may select the coding unit 520b, which has a size different from that of the others, from among the coding units 520a, 520b, and 520c.

According to an embodiment, the image decoding apparatus 150 may determine the widths or heights of the coding units 520a, 520b, and 520c by using the coordinates (xa, ya) indicating the position of the top left sample 530a of the upper coding unit 520a, the coordinates (xb, yb) indicating the position of the top left sample 530b of the middle coding unit 520b, and the coordinates (xc, yc) indicating the position of the top left sample 530c of the lower coding unit 520c. The image decoding apparatus 150 may determine the respective sizes of the coding units 520a, 520b, and 520c by using the coordinates (xa, ya), (xb, yb), and (xc, yc) indicating the positions of the coding units 520a, 520b, and 520c.

According to an embodiment, the image decoding apparatus 150 may determine the width of the upper coding unit 520a to be xb-xa and determine the height thereof to be yb-ya. According to an embodiment, the image decoding apparatus 150 may determine the width of the middle coding unit 520b to be xc-xb and determine the height thereof to be yc-yb. According to an embodiment, the image decoding apparatus 150 may determine the width or height of the lower coding unit 520c by using the width or height of the current coding unit 500 or the widths or heights of the upper and middle coding units 520a and 520b. The image decoding apparatus 150 may determine a coding unit, which has a size different from that of the others, based on the determined widths and heights of the coding units 520a, 520b, and 520c. Referring to FIG. 5, the image decoding apparatus 150 may determine the middle coding unit 520b, which has a size different from the size of the upper and lower coding units 520a and 520c, as the coding unit of the preset position. However, the above-described method, performed by the image decoding apparatus 150, of determining a coding unit having a size different from the size of the other coding units merely corresponds to an example of determining a coding unit at a preset position by using the sizes of coding units, which are determined based on coordinates of samples, and thus various methods of determining a coding unit at a preset position by comparing the sizes of coding units, which are determined based on coordinates of preset samples, may be used.

However, positions of samples considered to determine positions of coding units are not limited to the above-described top left positions, and information about random positions of samples included in the coding units may be used.

According to an embodiment, the image decoding apparatus 150 may select a coding unit at a preset position from among an odd number of coding units determined by splitting the current coding unit, considering the shape of the current coding unit. For example, when the current coding unit has a non-square shape, a width of which is longer than a height, the image decoding apparatus 150 may determine the coding unit at the preset position in a horizontal direction. That is, the image decoding apparatus 150 may determine one of coding units at different positions in a horizontal direction and put a restriction on the coding unit. When the current coding unit has a non-square shape, a height of which is longer than a width, the image decoding apparatus 150 may determine the coding unit at the preset position in a vertical direction. That is, the image decoding apparatus 150 may determine one of coding units at different positions in a vertical direction and may put a restriction on the coding unit.

According to an embodiment, the image decoding apparatus 150 may use information indicating respective positions of an even number of coding units, to determine the coding unit at the preset position from among the even number of coding units. The image decoding apparatus 150 may determine an even number of coding units by splitting the current coding unit, and may determine the coding unit at the preset position by using the information about the positions of the even number of coding units. An operation related thereto may correspond to the operation of determining a coding unit at a preset position (e.g., a center position) from among an odd number of coding units, which has been described in detail above in relation to FIG. 5, and thus detailed descriptions thereof are not provided here.

According to an embodiment, when a non-square current coding unit is split into a plurality of coding units, preset information about a coding unit at a preset position may be used in a splitting operation to determine the coding unit at the preset position from among the plurality of coding units. For example, the image decoding apparatus 150 may use at least one of block shape information and split shape information, which is stored in a sample included in a coding unit at a center position, in a splitting operation to determine the coding unit at the center position from among the plurality of coding units determined by splitting the current coding unit.

Referring to FIG. 5, the image decoding apparatus 150 may split the current coding unit 500 into a plurality of coding units 520a, 520b, and 520c based on at least one of the block shape information and the split shape information, and may determine a coding unit 520b at a center position from among the plurality of the coding units 520a, 520b, and 520c. Furthermore, the image decoding apparatus 150 may determine the coding unit 520b at the center position, in consideration of a position from which at least one of the block shape information and the split shape information is obtained. That is, at least one of the block shape information and the split shape information of the current coding unit 500 may be obtained from the sample 540 at a center position of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center position. However, information used to determine the coding unit at the center position is not limited to at least one of the block shape information and the split shape information, and various types of information may be used to determine the coding unit at the center position.

According to an embodiment, preset information for identifying the coding unit at the preset position may be obtained from a preset sample included in a coding unit to be determined. Referring to FIG. 5, the image decoding apparatus 150 may use at least one of the block shape information and the split shape information, which is obtained from a sample at a preset position in the current coding unit 500 (e.g., a sample at a center position of the current coding unit 500) to determine a coding unit at a preset position from among the plurality of the coding units 520*a*, 520*b*, and 520*c* determined by splitting the current coding unit 500 (e.g., a coding unit at a center position from among a plurality of split coding units). That is, the image decoding apparatus 150 may determine the sample at the preset position by considering a block shape of the current coding unit 500, determine the coding unit 520*b* including a sample, from which preset information (e.g., at least one of the block shape information and the split shape information) may be obtained, from among the plurality of coding units 520*a*, 520*b*, and 520*c* determined by splitting the current coding unit 500, and may put a preset restriction on the coding unit 520*b*. Referring to FIG. 5, according to an embodiment, the image decoding apparatus 150 may determine the sample 540 at the center position of the current coding unit 500 as the sample from which the preset information may be obtained, and may put a preset restriction on the coding unit 520*b* including the sample 540, in a decoding operation. However, the position of the sample from which the preset information may be obtained is not limited to the above-described position, and may include arbitrary positions of samples included in the coding unit 520*b* to be determined for a restriction.

According to an embodiment, the position of the sample from which the preset information may be obtained may be determined based on the shape of the current coding unit 500. According to an embodiment, the block shape information may indicate whether the current coding unit has a square or non-square shape, and the position of the sample from which the preset information may be obtained may be determined based on the shape. For example, the image decoding apparatus 150 may determine a sample positioned on a boundary for dividing at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 150 may determine one of samples adjacent to a boundary for dividing a long side of the current coding unit in half, as the sample from which the preset information may be obtained.

According to an embodiment, when the current coding unit is split into a plurality of coding units, the image decoding apparatus 150 may use at least one of the block shape information and the split shape information to determine a coding unit at a preset position from among the plurality of coding units. According to an embodiment, the image decoding apparatus 150 may obtain at least one of the block shape information and the split shape information from a sample at a preset position in a coding unit, and may split the plurality of coding units, which are generated by splitting the current coding unit, by using at least one of the split shape information and the block shape information, which is obtained from the sample of the preset position in each of the plurality of coding units. That is, a coding unit may be recursively split based on at least one of the block shape information and the split shape information, which is obtained from the sample at the preset position in each coding unit. An operation of recursively splitting a coding unit has been described above in relation to FIG. 4, and thus detailed descriptions thereof will not be provided here.

According to an embodiment, the image decoding apparatus 150 may determine one or more coding units by splitting the current coding unit, and may determine an order of decoding the one or more coding units, based on a preset block (e.g., the current coding unit).

Figure 6:
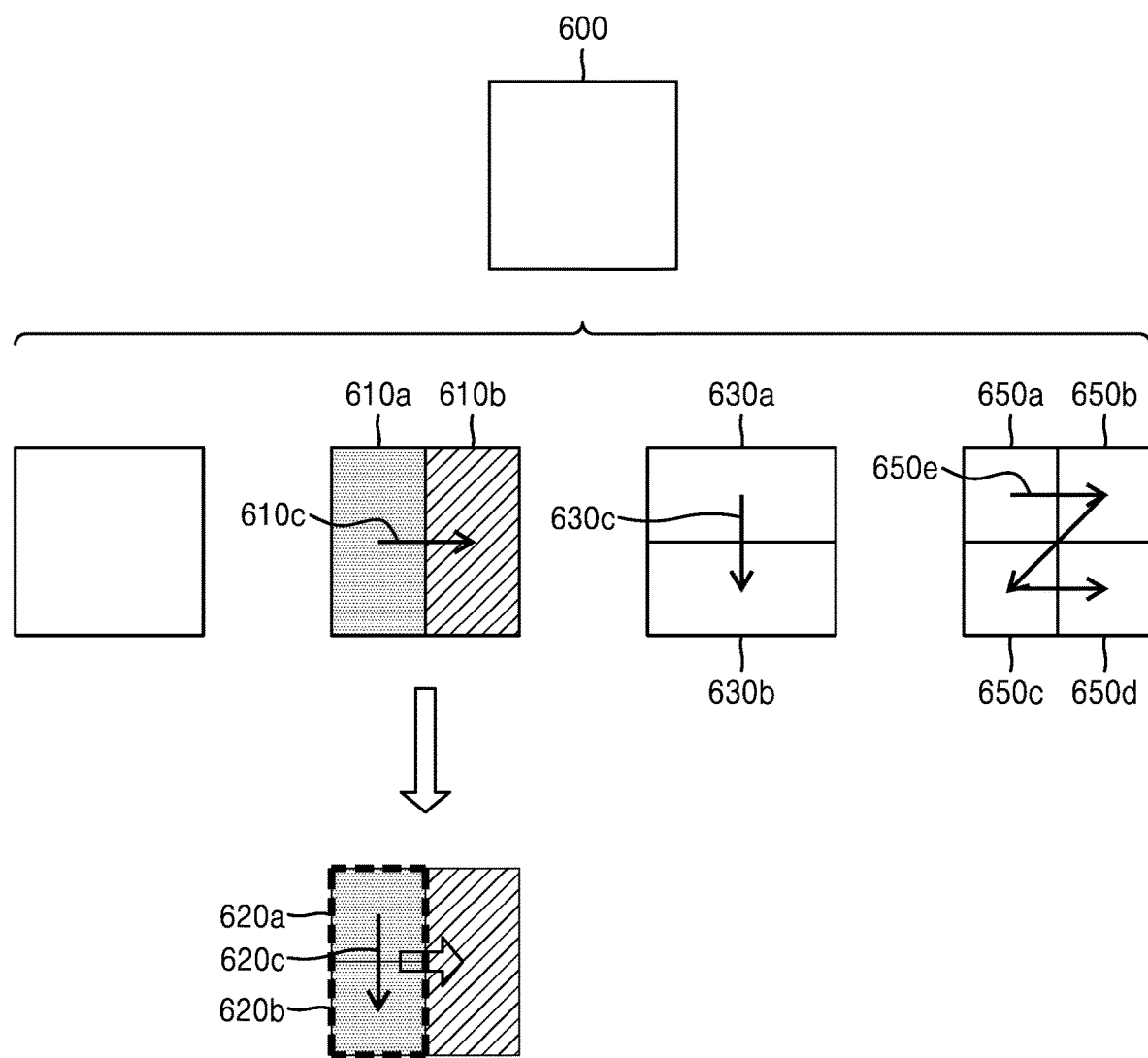
FIG. 6 illustrates an order of processing a plurality of coding units when the plurality of coding units are determined by splitting a current coding unit, according to an embodiment.

FIG. 6 illustrates an order of processing a plurality of coding units when the image decoding apparatus 150 determines the plurality of coding units by splitting a current coding unit, according to an embodiment.

According to an embodiment, the image decoding apparatus 150 may determine second coding units 610*a* and 610*b* by splitting a first coding unit 600 in a vertical direction, may determine second coding units 630*a* and 630*b* by splitting the first coding unit 600 in a horizontal direction, or may determine second coding units 650*a*, 650*b*, 650*c*, and 650*d* by splitting the first coding unit 600 in vertical and horizontal directions, based on block shape information and split shape information.

Referring to FIG. 6, the image decoding apparatus 150 may determine to process the second coding units 610*a* and 610*b*, which are determined by splitting the first coding unit 600 in a vertical direction, in a horizontal direction order 610*c*. The image decoding apparatus 150 may determine to process the second coding units 630*a* and 630*b*, which are determined by splitting the first coding unit 600 in a horizontal direction, in a vertical direction order 630*c*. The image decoding apparatus 150 may determine to process the second coding units 650*a*, 650*b*, 650*c*, and 650*d*, which are determined by splitting the first coding unit 600 in vertical and horizontal directions, according to a preset order (e.g., a raster scan order or Z-scan order 650*e*) by which coding units in a row are processed and then coding units in a next row are processed.

According to an embodiment, the image decoding apparatus 150 may recursively split coding units. Referring to FIG. 6, the image decoding apparatus 150 may determine a plurality of coding units 610*a*, 610*b*, 630*a*, 630*b*, 650*a*, 650*b*, 650*c*, and 650*d* by splitting the first coding unit 600, and may recursively split each of the determined plurality of coding units 610*a*, 610*b*, 630*a*, 630*b*, 650*a*, 650*b*, 650*c*, and 650*d*. A splitting method of the plurality of coding units 610*a*, 610*b*, 630*a*, 630*b*, 650*a*, 650*b*, 650*c*, and 650*d* may correspond to a splitting method of the first coding unit 600. As such, each of the plurality of coding units 610*a*, 610*b*, 630*a*, 630*b*, 650*a*, 650*b*, 650*c*, and 650*d* may be independently split into a plurality of coding units. Referring to FIG. 6, the image decoding apparatus 150 may determine the second coding units 610*a* and 610*b* by splitting the first coding unit 600 in a vertical direction, and may determine to independently split or not to split each of the second coding units 610*a* and 610*b*.

According to an embodiment, the image decoding apparatus 150 may determine third coding units 620*a* and 620*b* by splitting the left second coding unit 610*a* in a horizontal direction, and may not split the right second coding unit 610*b*.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 620*a* and 620*b* determined by splitting the left second coding unit 610*a*, independently of the right second coding unit 610*b*. Because the third coding units 620*a* and 620*b* are determined by splitting the left second coding unit 610*a* in a horizontal direction, the third coding units 620*a* and 620*b* may be processed in a vertical direction order 620*c*. Because the left and right second coding units 610*a* and 610*b* are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a preset order.

Figure 7:
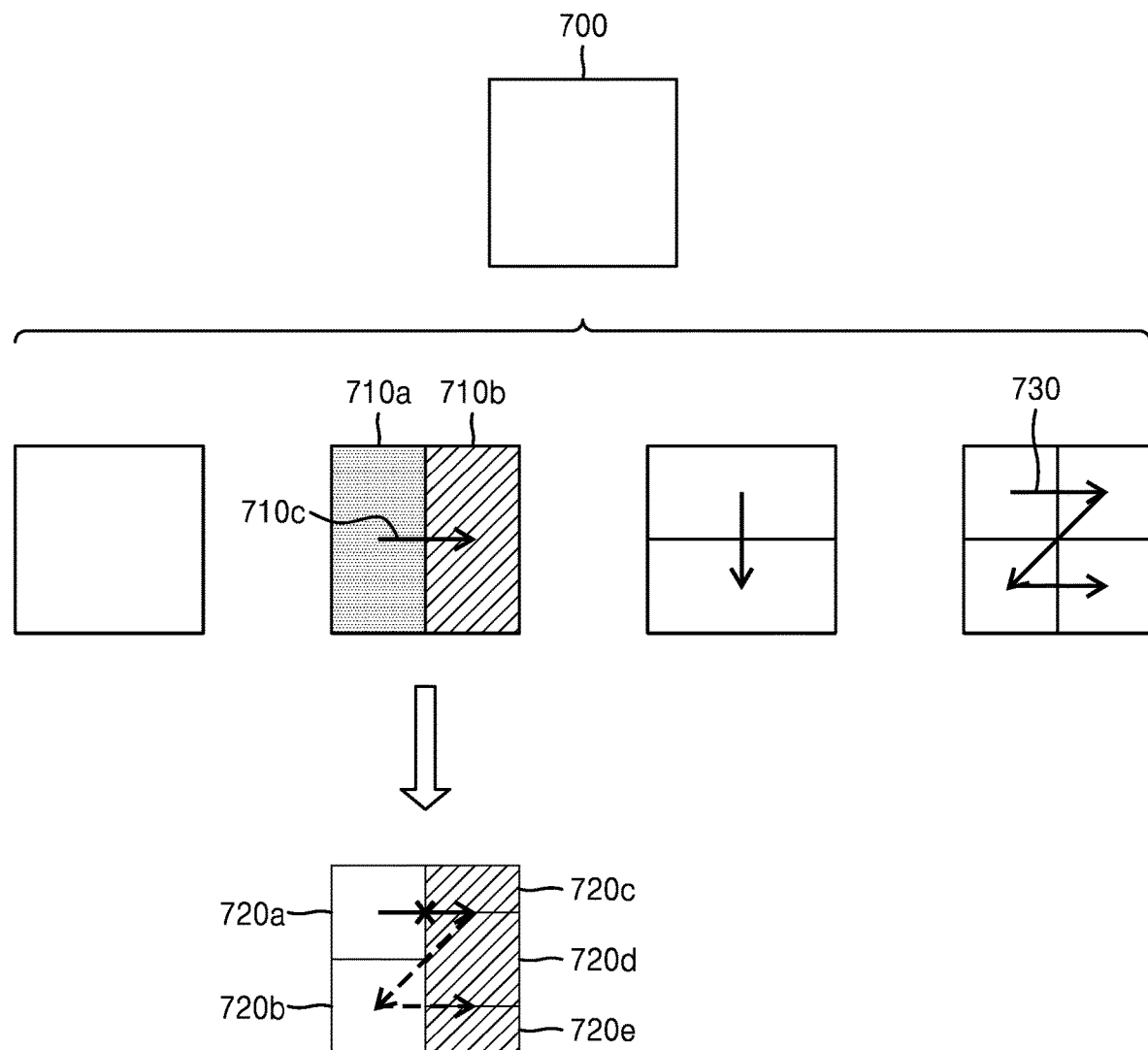
FIG. 7 illustrates a process of determining that a current coding unit is to be split into an odd number of coding units, when the coding units are not processable in a preset order, according to an embodiment.

FIG. 7 illustrates a process, performed by the image decoding apparatus 150, of determining that a current coding unit is to be split into an odd number of coding units, when the coding units are not processable in a preset order, according to an embodiment.

According to an embodiment, the image decoding apparatus 150 may determine whether the current coding unit is to be split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding apparatus 150 may determine a plurality of third coding units 720a and 720b by splitting the left second coding unit 710a in a horizontal direction, and may split the right second coding unit 710b into an odd number of third coding units 720c to 720e.

According to an embodiment, the image decoding apparatus 150 may determine whether any coding unit is to be split into an odd number of coding units, by determining whether the third coding units 720a and 720b, and 720c to 720e are processable in a preset order. Referring to FIG. 7, the image decoding apparatus 150 may determine the third coding units 720a and 720b, and 720c to 720e by recursively splitting the first coding unit 700. The image decoding apparatus 150 may determine whether any of the first coding unit 700, the second coding units 710a and 710b, and the third coding units 720a and 720b, and 720c, 720d, and 720e is to be split into an odd number of coding units, based on at least one of the block shape information and the split shape information. For example, a second coding unit located in the right from among the second coding units 710a and 710b may be split into an odd number of third coding units 720c, 720d, and 720e. A processing order of a plurality of coding units included in the first coding unit 700 may be a preset order (e.g., a Z-scan order 730), and the image decoding apparatus 70 may determine whether the third coding units 720c, 720d, and 720e, which are determined by splitting the right second coding unit 710b into an odd number of coding units, satisfy a condition for processing in the preset order.

According to an embodiment, the image decoding apparatus 150 may determine whether the third coding units 720a and 720b, and 720c, 720d, and 720e included in the first coding unit 700 satisfy the condition for processing in the preset order, and the condition relates to whether at least one of a width and height of the second coding units 710a and 710b is to be divided in half along a boundary of the third coding units 720a and 720b, and 720c, 720d, and 720e. For example, the third coding units 720a and 720b determined by dividing the height of the non-square left second coding unit 710a in half satisfy the condition. However, because boundaries of the third coding units 720c, 720d, and 720e determined by splitting the right second coding unit 710b into three coding units do not divide the width or height of the right second coding unit 710b in half, it may be determined that the third coding units 720c, 720d, and 720e do not satisfy the condition. When the condition is not satisfied as described above, the image decoding apparatus 150 may decide disconnection of a scan order, and determine that the right second coding unit 710b is to be split into an odd number of coding units, based on a result of the decision. According to an embodiment, when a coding unit is split into an odd number of coding units, the image decoding apparatus 150 may put a preset restriction on a coding unit at a preset position among the split coding units. The restriction or the preset position has been described above in relation to various embodiments, and thus detailed descriptions thereof will not be provided here.

Figure 8:
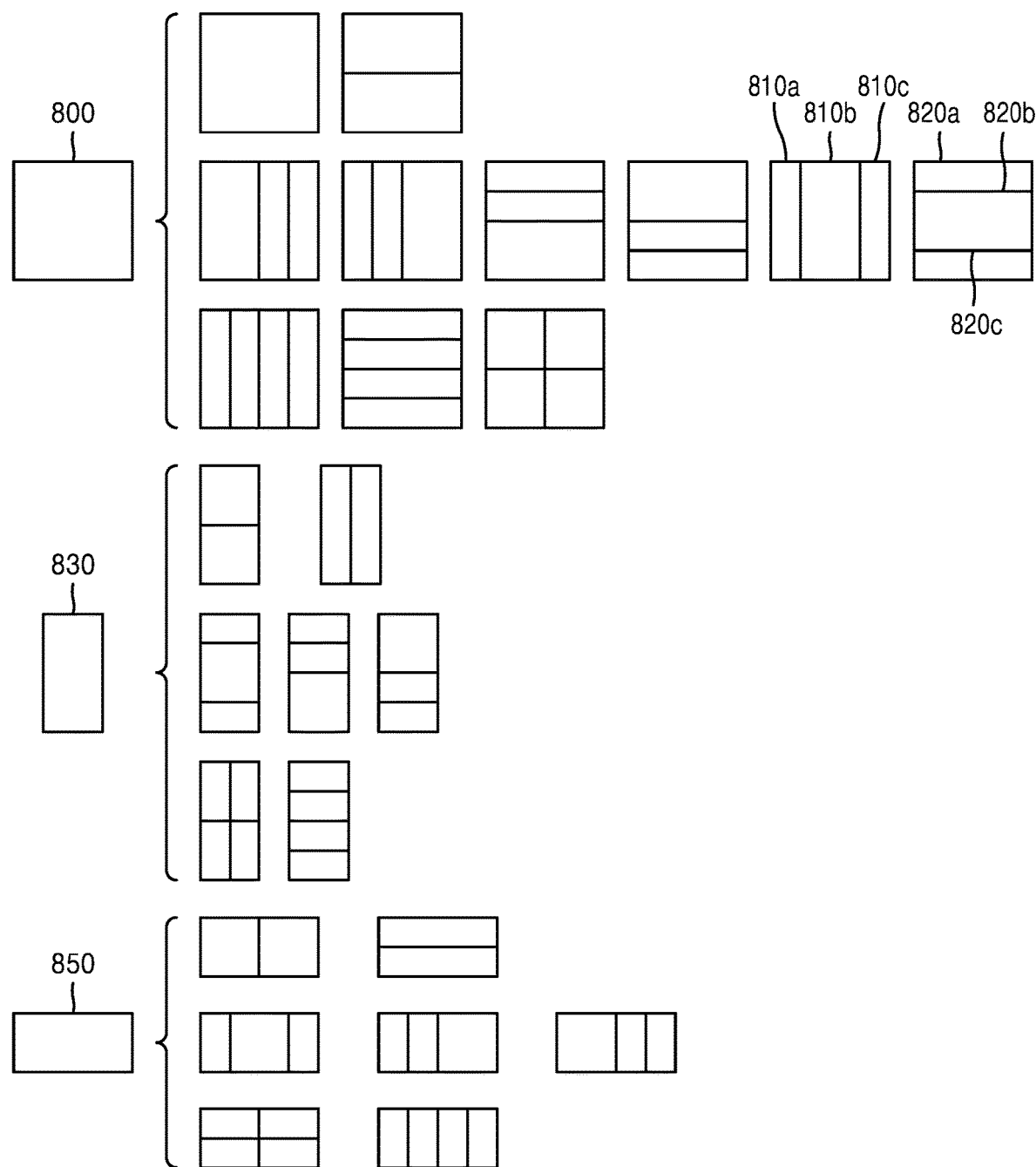
FIG. 8 illustrates a process of determining at least one coding unit by splitting a first coding unit, according to an embodiment.

FIG. 8 illustrates a process, performed by the image decoding apparatus 150, of determining at least one coding unit by splitting a first coding unit 800, according to an embodiment. According to an embodiment, the image decoding apparatus 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding apparatus 150 may split the first coding unit 800 into a plurality of non-square coding units. In detail, when the split shape information indicates to determine an odd number of coding units by splitting the first coding unit 800 in a horizontal direction or a vertical direction, the image decoding apparatus 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding apparatus 150 may determine whether the second coding units 810a, 810b, 810c, 820a, 820b, and 820c included in the first coding unit 800 satisfy a condition for processing in a preset order, and the condition relates to whether at least one of a width and height of the first coding unit 800 is to be divided in half along a boundary of the second coding units 810a, 810b, 810c, 820a, 820b, and 820c. Referring to FIG. 8, because boundaries of the second coding units 810a, 810b, and 810c determined by splitting the square first coding unit 800 in a vertical direction do not divide the height of the first coding unit 800 in half, it may be determined that the first coding unit 800 does not satisfy the condition for processing in the preset order. In addition, because boundaries of the second coding units 820a, 820b, and 820c determined by splitting the square first coding unit 800 in a horizontal direction do not divide the width of the first coding unit 800 in half, it may be determined that the first coding unit 800 does not satisfy the condition for processing in the preset order. When the condition is not satisfied as described above, the image decoding apparatus 150 may decide disconnection of a scan order, and may determine that the first coding unit 800 is to be split into an odd number of coding units, based on a result of the decision. According to an embodiment, when a coding unit is split into an odd number of coding units, the image decoding apparatus 150 may put a preset restriction on a coding unit at a preset position from among the split coding units. The restriction or the preset position has been described above in relation to various embodiments, and thus detailed descriptions thereof will not be provided herein.

According to an embodiment, the image decoding apparatus 150 may determine various-shaped coding units by splitting a first coding unit.

Referring to FIG. 8, the image decoding apparatus 150 may split the square first coding unit 800 or a non-square first coding unit 830 or 850 into various-shaped coding units.

Figure 9:
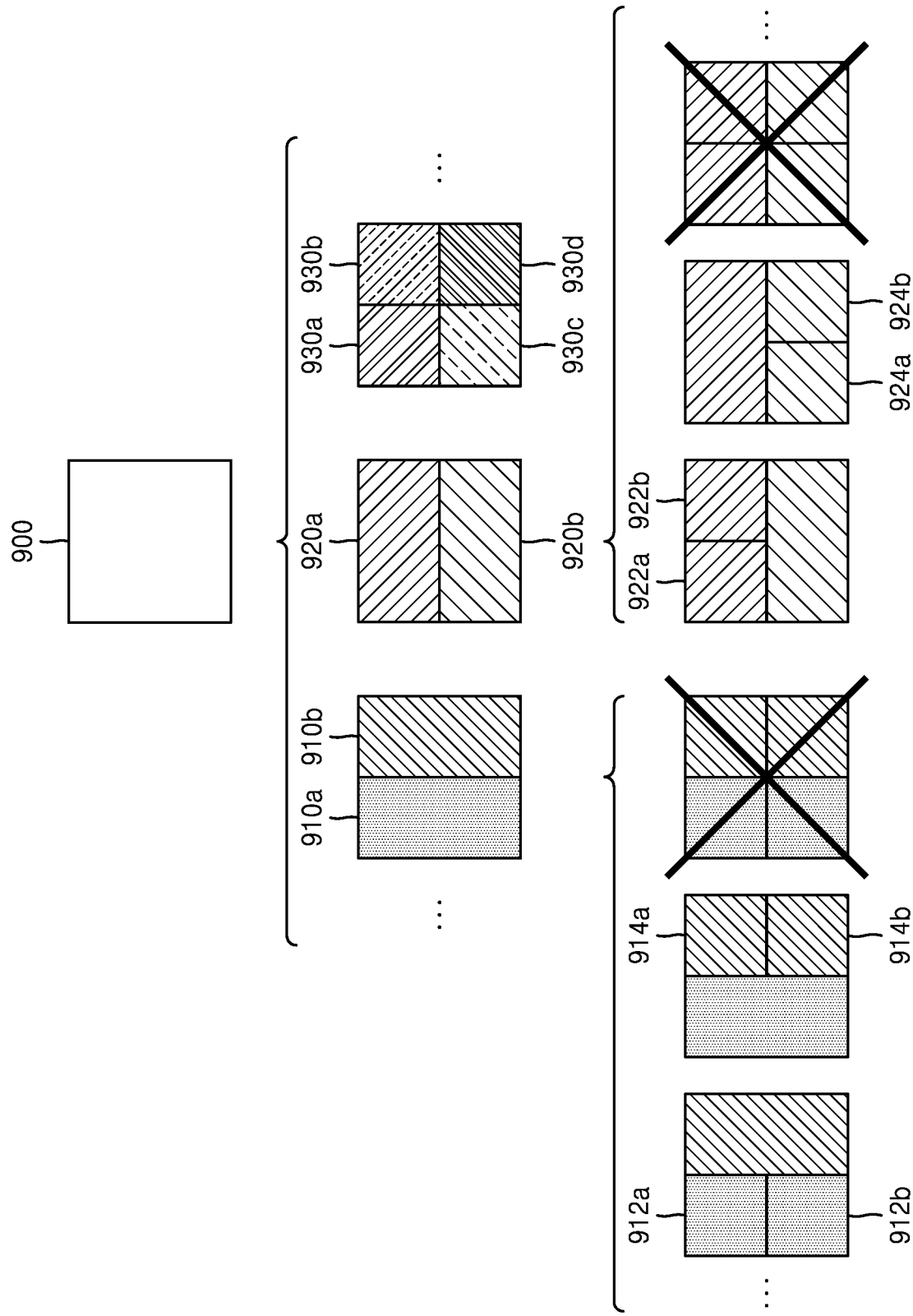
FIG. 9 illustrates that a shape into which a second coding unit is splittable is restricted when the second coding unit having a non-square shape, which is determined by splitting a first coding unit, satisfies a preset condition, according to an embodiment.
Figure 10:
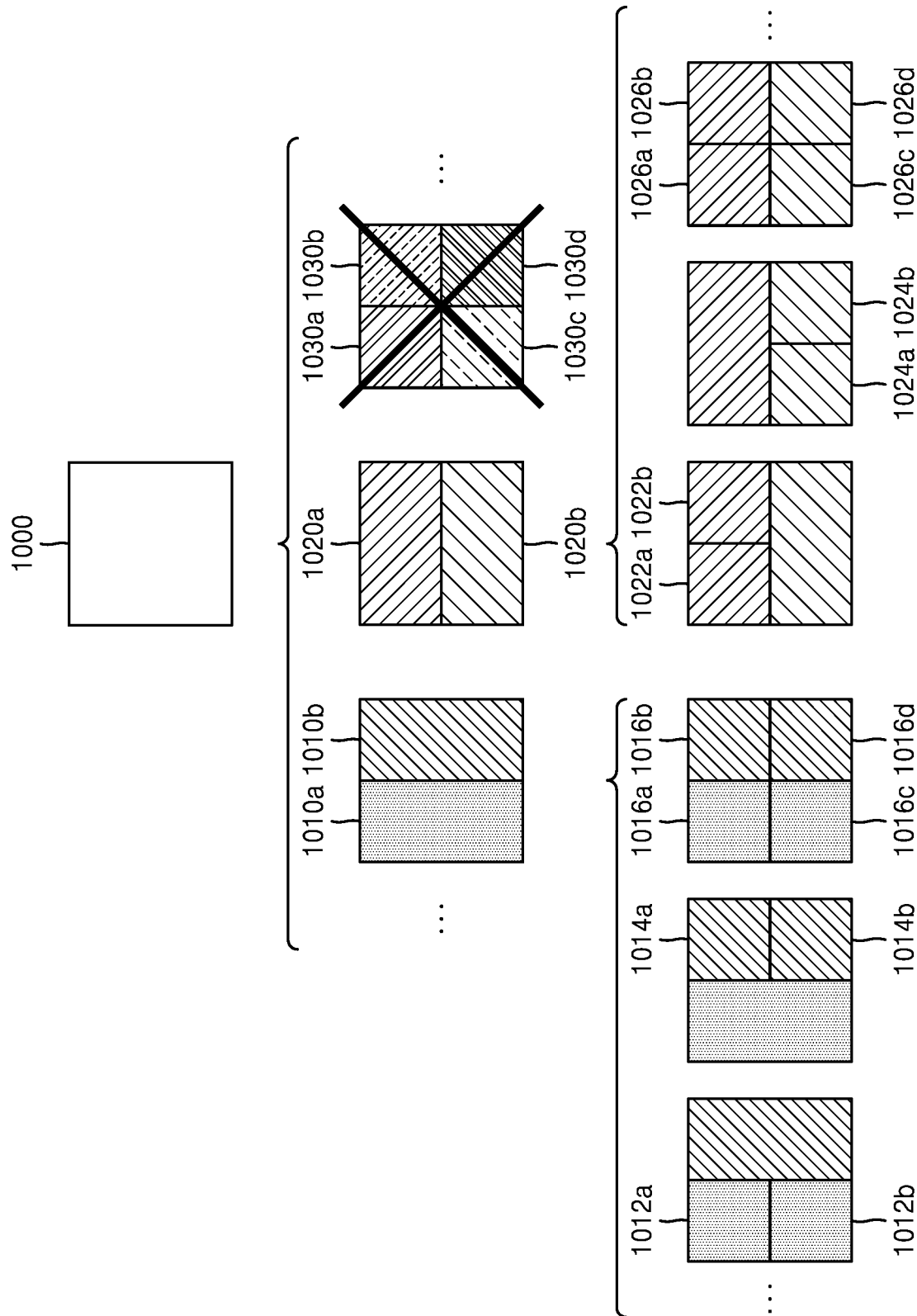
FIG. 10 illustrates a process of splitting a square coding unit when split shape information indicates that the square coding unit is not to be split into four square coding units, according to an embodiment.

FIG. 9 illustrates that a shape into which a second coding unit is splittable by the image decoding apparatus 150 is restricted when the second coding unit having a non-square shape, which is determined by splitting a first coding unit 900, satisfies a preset condition, according to an embodiment.

According to an embodiment, the image decoding apparatus 150 may determine to split the square first coding unit 900 into non-square second coding units 910a, 910b, 920a, and 920b, based on at least one of block shape information and split shape information, which is obtained by the receiver 160. The second coding units 910a, 910b, 920a, and 920b may be independently split. As such, the image decoding apparatus 150 may determine to split or not to split the first coding unit 900 into a plurality of coding units, based on at least one of the block shape information and the split shape information of each of the second coding units 910a, 910b, 920a, and 920b. According to an embodiment, the image decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding apparatus 150 may restrict the right second coding unit 910b to not be split in a horizontal direction in which the left second coding unit 910a is split. When third coding units 914a and 914b are determined by splitting the right second coding unit 910b in a same direction, because the left and right second coding units 910a and 910b are independently split in a horizontal direction, the third coding units 912a, 912b, 914a, and 914b may be determined. However, this case serves equally as a case in which the image decoding apparatus 150 splits the first coding unit 900 into four square second coding units 930a, 930b, 930c, and 930d, based on at least one of the block shape information and the split shape information, and may be inefficient in terms of image decoding.

According to an embodiment, the image decoding apparatus 150 may determine third coding units 922a, 922b, 924a, and 924b by splitting the non-square second coding unit 920a or 920b, which is determined by splitting the first coding unit 900 in a horizontal direction, in a vertical direction. However, when a second coding unit (e.g., the upper second coding unit 920a) is split in a vertical direction, for the above-described reason, the image decoding apparatus 150 may restrict the other second coding unit (e.g., the lower second coding unit 920b) to not be split in a vertical direction in which the upper second coding unit 920a is split.

FIG. 18 illustrates a process, performed by the image decoding apparatus 150, of splitting a square coding unit when split shape information indicates that the square coding unit is not to be split into four square coding units, according to an embodiment.

According to an embodiment, the image decoding apparatus 150 may determine second coding units 1010a, 1010b, 1020a, 1020b, etc. by splitting a first coding unit 1000, based on at least one of block shape information and split shape information. The split shape information may include information about various methods of splitting a coding unit but, the information about various splitting methods may not include information for splitting a coding unit into four square coding units. According to such split shape information, the image decoding apparatus 150 may not split the first square coding unit 1000 into four square second coding units 1030a, 1030b, 1030c, and 1030d. The image decoding apparatus 150 may determine the non-square second coding units 1010a, 1010b, 1020a, 1020b, etc., based on the split shape information.

According to an embodiment, the image decoding apparatus 150 may independently split the non-square second coding units 1010a, 1010b, 1020a, 1020b, etc. Each of the second coding units 1010a, 1010b, 1020a, 1020b, etc. may be recursively split in a preset order, and this splitting method may correspond to a method of splitting the first coding unit 1000, based on at least one of the block shape information and the split shape information.

For example, the image decoding apparatus 150 may determine square third coding units 1012a and 1012b by splitting the left second coding unit 1010a in a horizontal direction, and may determine square third coding units 1014a and 1014b by splitting the right second coding unit 1010b in a horizontal direction. Furthermore, the image decoding apparatus 150 may determine square third coding units 1016a, 1016b, 1016c, and 1016d by splitting both of the left and right second coding units 1010a and 1010b in a horizontal direction. In this case, coding units having the same shape as the four square second coding units 1030a, 1030b, 1030c, and 1030d split from the first coding unit 1000 may be determined.

As another example, the image decoding apparatus 150 may determine square third coding units 1022a and 1022b by splitting the upper second coding unit 1020a in a vertical direction, and may determine square third coding units 1024a and 1024b by splitting the lower second coding unit 1020b in a vertical direction. Furthermore, the image decoding apparatus 150 may determine square third coding units 1022a, 1022b, 1024a, and 1024b by splitting both of the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
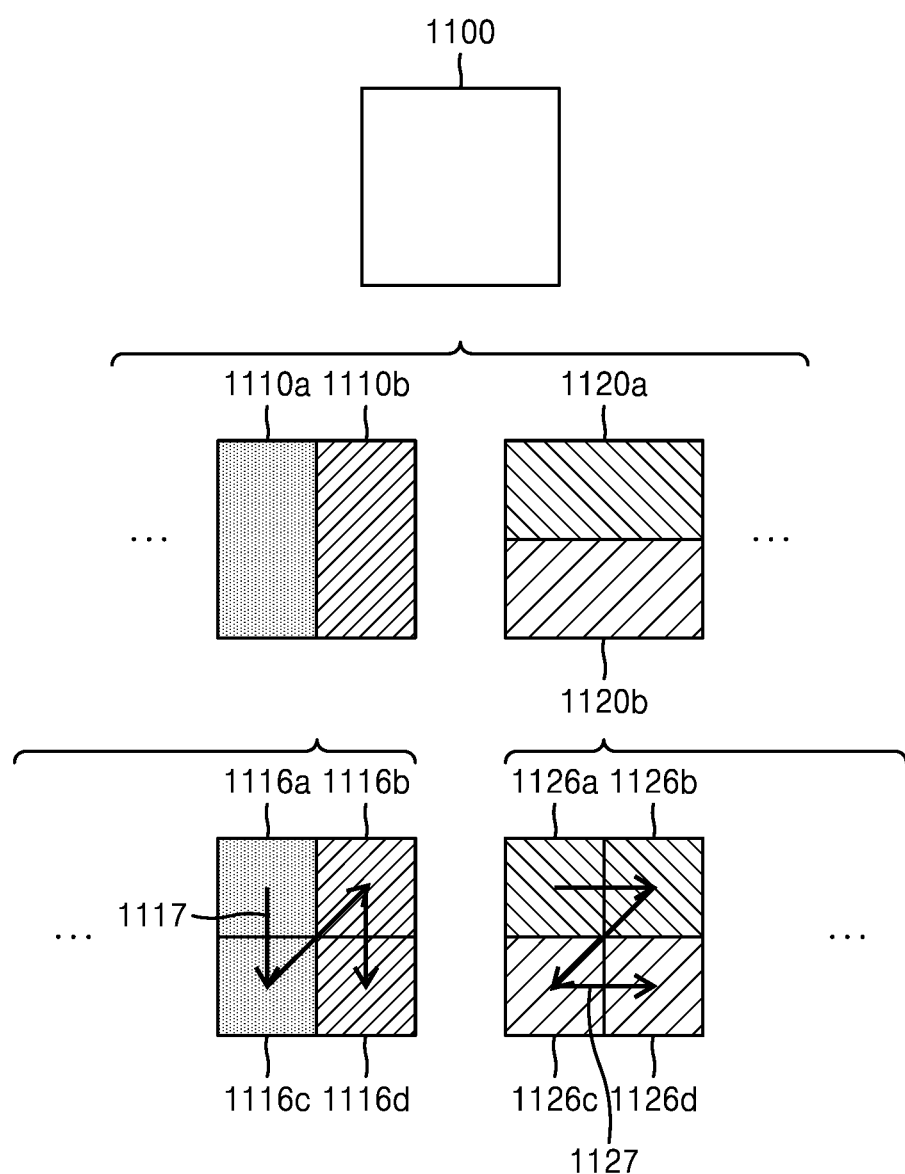
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the image decoding apparatus 150 may split a first coding unit 1100, based on block shape information and split shape information. When the block shape information indicates a square shape and the split shape information indicates to split the first coding unit 1100 in at least one of horizontal and vertical directions, the image decoding apparatus 150 may determine second coding units 1110a, 1110b, 1120a, and 1120b by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the image decoding apparatus 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126*a*, 1126*b*, 1126*c*, and 1126*d* by splitting the second coding units 1120*a* and 1120*b*, which are generated by splitting the first coding unit 1100 in a horizontal direction, in a vertical direction. An operation of splitting the second coding units 1110*a*, 1110*b*, 1120*a*, and 1120*b* has been described above in relation to FIG. 9, and thus detailed descriptions thereof will not be provided herein.

According to an embodiment, the image decoding apparatus 150 may process coding units in a preset order. An operation of processing coding units in a preset order has been described above in relation to FIG. 6, and thus detailed descriptions thereof will not be provided herein. Referring to FIG. 11, the image decoding apparatus 150 may determine four square third coding units 1116*a*, 1116*b*, 1116*c*, and 1116*d*, and 1126*a*, 1126*b*, 1126*c*, and 1126*d* by splitting the square first coding unit 1100. According to an embodiment, the image decoding apparatus 150 may determine processing orders of the third coding units 1116*a*, 1116*b*, 1116*c*, and 1116*d*, and 1126*a*, 1126*b*, 1126*c*, and 1126*d* based on a splitting method of the first coding unit 1100.

According to an embodiment, the image decoding apparatus 150 may determine the third coding units 1116*a*, 1116*b*, 1116*c*, and 1116*d* by splitting the second coding units 1110*a* and 1110*b* generated by splitting the first coding unit 1100 in a vertical direction, in a horizontal direction, and may process the third coding units 1116*a*, 1116*b*, 1116*c*, and 1116*d* in a processing order 1117 for initially processing the third coding units 1116*a* and, which are included in the left second coding unit 1110*a*, in a vertical direction and then processing the third coding unit 1116*b* and 1116*d*, which are included in the right second coding unit 1110*b*, in a vertical direction.

According to an embodiment, the image decoding apparatus 150 may determine the third coding units 1126*a*, 1126*b*, 1126*c*, and 1126*d* by splitting the second coding units 1120*a* and 1120*b* generated by splitting the first coding unit 1100 in a horizontal direction, in a vertical direction, and may process the third coding units 1126*a*, 1126*b*, 1126*c*, and 1126*d* in a processing order 1127 for initially processing the third coding units 1126*a* and 1126*b*, which are included in the upper second coding unit 1120*a*, in a horizontal direction and then processing the third coding unit 1126*c* and 1126*d*, which are included in the lower second coding unit 1120*b*, in a horizontal direction.

Referring to FIG. 11, the square third coding units 1116*a*, 1116*b*, 1116*c*, and 1116*d*, and 1126*a*, 1126*b*, 1126*c*, and 1126*d* may be determined by splitting the second coding units 1110*a*, 1110*b*, 1120*a*, and 1120*b*, respectively. Although the second coding units 1110*a* and 1110*b* are determined by splitting the first coding unit 1100 in a vertical direction differently from the second coding units 1120*a* and 1120*b* which are determined by splitting the first coding unit 1100 in a horizontal direction, the third coding units 1116*a*, 1116*b*, 1116*c*, and 1116*d*, and 1126*a*, 1126*b*, 1126*c*, and 1126*d* split therefrom eventually show same-shaped coding units split from the first coding unit 1100. As such, by recursively splitting a coding unit in different manners based on at least one of the block shape information and the split shape information, the image decoding apparatus 150 may process a plurality of coding units in different orders even when the coding units are eventually determined to be the same shape.

FIG. 12 illustrates a process of determining a depth of a coding unit as a shape and size of the coding unit change, when the coding unit is recursively split such that a plurality of coding units are determined, according to an embodiment.

According to an embodiment, the image decoding apparatus 150 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the image decoding apparatus 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by dividing a width and height of the first coding unit 1200 to ½ may have a size of N×N. Furthermore, the third coding unit 1204 determined by dividing a width and height of the second coding unit 1202 to ½ may have a size of N/2×N/2. In this case, a width and height of the third coding unit 1204 are ½ times those of the first coding unit 1200. When a depth of the first coding unit 1200 is D, a depth of the second coding unit 1202, the width and height of which are ½$_1$ times those of the first coding unit 1200, may be D+1, and a depth of the third coding unit 1204, the width and height of which are ½ times those of the first coding unit 1200, may be D+2.

According to an embodiment, the image decoding apparatus 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 150 may determine a second coding unit 1202, 1212, or 1222 by dividing at least one of a width and height of the first coding unit 1210 having a size of N×2N. That is, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding apparatus 150 may determine the second coding unit 1202, 1212, or 1222 by dividing at least one of a width and height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding apparatus 150 may determine a third coding unit 1204, 1214, or 1224 by dividing at least one of a width and height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding apparatus 150 may determine the third coding unit 1204, 1214, or 1224 by dividing at least one of a width and height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding apparatus 150 may determine the third coding unit 1204, 1214, or 1224 by dividing at least one of a width and height of the second coding unit 1212 having a size of N×N/2. That is, the image decoding apparatus 150 may determine the third coding unit 1204 having a size of N/2×N/2 or the third coding unit 1214 having a size of N/2×N/2 by splitting the second coding unit 1222 in a vertical direction, or may determine the third coding unit 1224 having a size of N/2×N/2 by splitting the second coding unit 1222 in vertical and horizontal directions.

According to an embodiment, the image decoding apparatus 150 may split the square coding unit 1200, 1202, or 1204 in a horizontal or vertical direction. For example, the image decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of the longest side of a coding unit, a depth of a coding unit determined by splitting the first coding unit 1200, 1202 or 1204 having a size of 2N×2N in a horizontal or vertical direction may be the same as the depth of the first coding unit 1200, 1202 or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1222, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
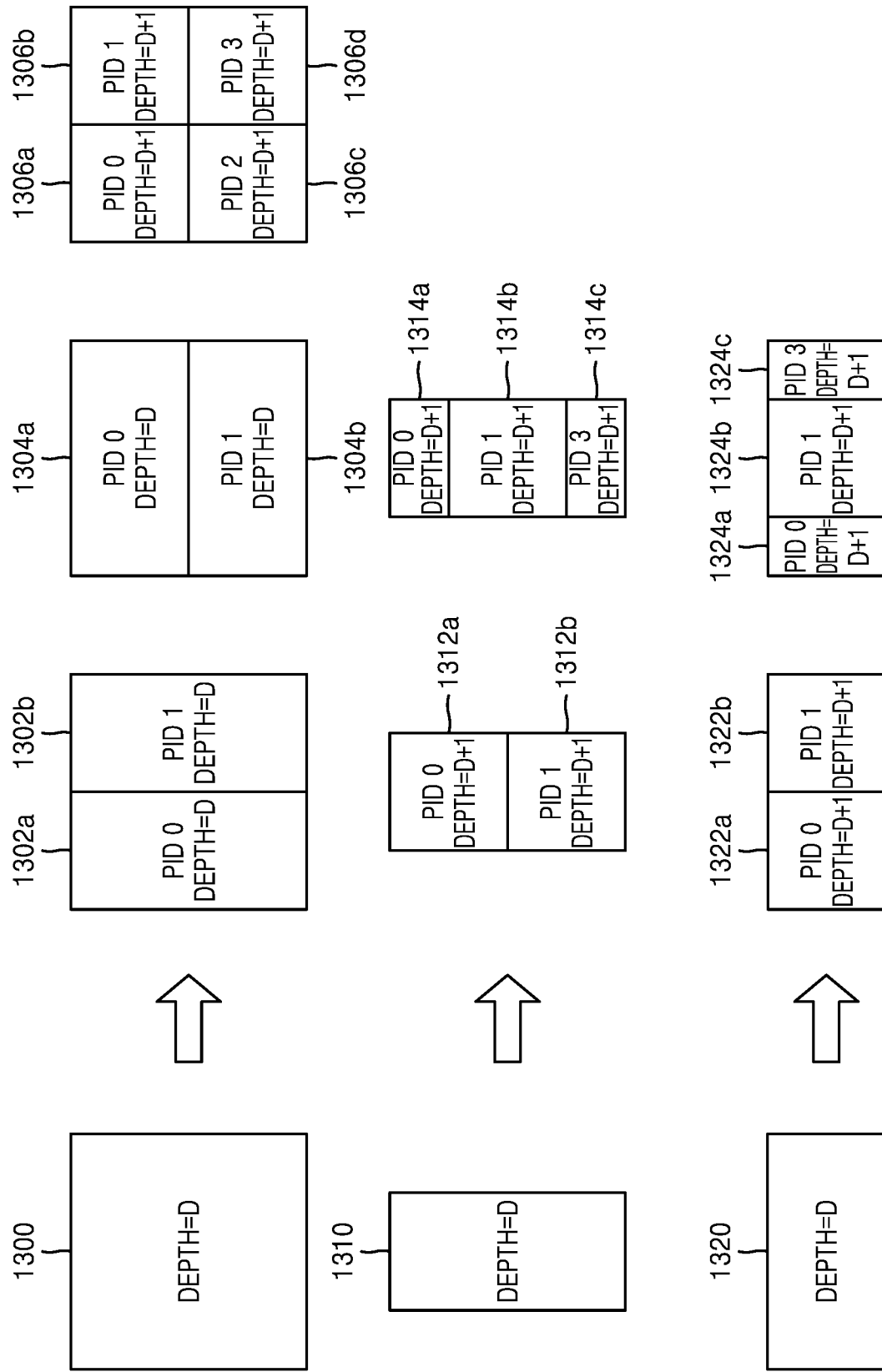
FIG. 13 illustrates depths that are determinable based on shapes and sizes of coding units, and part indexes (PIDs) that are for distinguishing the coding units, according to an embodiment.

FIG. 13 illustrates depths that are determinable based on shapes and sizes of coding units, and part indexes (PIDs) that are for distinguishing the coding units, according to an embodiment.

According to an embodiment, the image decoding apparatus 150 may determine various-shape second coding units by splitting a square first coding unit 1300. Referring to FIG. 13, the image decoding apparatus 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding apparatus 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding apparatus 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding apparatus 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding apparatus 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a and 1312b, 1314a, 1314b, and 1314c, 1322a and 1322b, and 1324a, 1324b, and 1324c, which are determined based on the split shape information of the non-square first coding unit 1310 or 1320, may be determined based on the length of a long side thereof. For example, because the length of a side of the square second coding units 1312a and 1312b is ½ times the length of a long side of the first coding unit 1310 having a non-square shape, a height of which is longer than a width, a depth of the square second coding units 1312a and 1312b is D+1 which is deeper than the depth D of the non-square first coding unit 1310 by 1.

Furthermore, the image decoding apparatus 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a long side of the first coding unit 1310, a depth of the second coding units 1314a, 1314b, and 1314c may be D+1 which is deeper than the depth D of the non-square first coding unit 1310 by 1. The image decoding apparatus 150 may determine depths of coding units split from the first coding unit 1320 having a non-square shape, a width of which is longer than a height, by using the above-described method of determining depths of coding units split from the first coding unit 1310.

According to an embodiment, the image decoding apparatus 150 may determine PIDs for identifying split coding units, based on a size ratio between the coding units when an odd number of split coding units do not have equal sizes. Referring to FIG. 13, a coding unit 1314b of a center position among an odd number of split coding units 1314a, 1314b, and 1314c may have a width equal to that of the other coding units 1314a and 1314c and a height which is two times that of the other coding units 1314a and 1314c. That is, in this case, the coding unit 1314b at the center position may include two of the other coding unit 1314a or 1314c. Therefore, when a PID of the coding unit 1314b at the center position is 1 based on a scan order, a PID of the coding unit 1314c located next to the coding unit 1314b may be increased by 2 and thus may be 3. That is, discontinuity in PID values may be present. According to an embodiment, the image decoding apparatus 150 may determine whether an odd number of split coding units do not have equal sizes, based on whether discontinuity is present in PIDs for identifying the split coding units.

According to an embodiment, the image decoding apparatus 150 may determine whether to use a specific splitting method, based on PID values for identifying a plurality of coding units determined by splitting a current coding unit. Referring to FIG. 13, the image decoding apparatus 150 may determine an even number of coding units 1312a and 1312b or an odd number of coding units 1314a, 1314b, and 1314c by splitting the first coding unit 1310 having a rectangular shape, a height of which is longer than a width. The image decoding apparatus 150 may use PIDs to identify respective coding units. According to an embodiment, the PID may be obtained from a sample of a preset position of each coding unit (e.g., a top left sample).

According to an embodiment, the image decoding apparatus 150 may determine a coding unit at a preset position from among the split coding units, by using the PIDs for distinguishing the coding units. According to an embodiment, when the split shape information of the first coding unit 1310 having a rectangular shape, a height of which is longer than a width, indicates to split a coding unit into three coding units, the image decoding apparatus 150 may split the first coding unit 1310 into three coding units 1314a, 1314b, and 1314c. The image decoding apparatus 150 may assign a PID to each of the three coding units 1314a, 1314b, and 1314c. The image decoding apparatus 150 may compare PIDs of an odd number of split coding units to determine a coding unit at a center position from among the coding units. The image decoding apparatus 150 may determine the coding unit 1314b having a PID corresponding to a middle value among the PIDs of the coding units, as the coding unit at the center position from among the coding units determined by splitting the first coding unit 1310. According to an embodiment, the image decoding apparatus 150 may determine PIDs for distinguishing split coding units, based on a size ratio between the coding units when the split coding units do not have equal sizes. Referring to FIG. 13, the coding unit 1314b generated by splitting the first coding unit 1310 may have a width equal to that of the other coding units 1314a and 1314c and a height which is two times that of the other coding units 1314a and 1314c. In this case, when the PID of the coding unit 1314b at the center position is 1, the PID of the coding unit 1314c located next to the coding unit 1314b may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a preset position among an odd number of coding units (e.g., a coding unit of a centre position) has a size different from that of the other coding units. In this case, the image decoding apparatus 150 may determine the coding unit of the centre position, which has a different size, by using PIDs of the coding units. However, the PIDs and the size or position of the coding unit of the preset position are not limited to the above-described examples, and various PIDs and various positions and sizes of coding units may be used.

According to an embodiment, the image decoding apparatus 150 may use a preset data unit where a coding unit starts to be recursively split.

Figure 14:
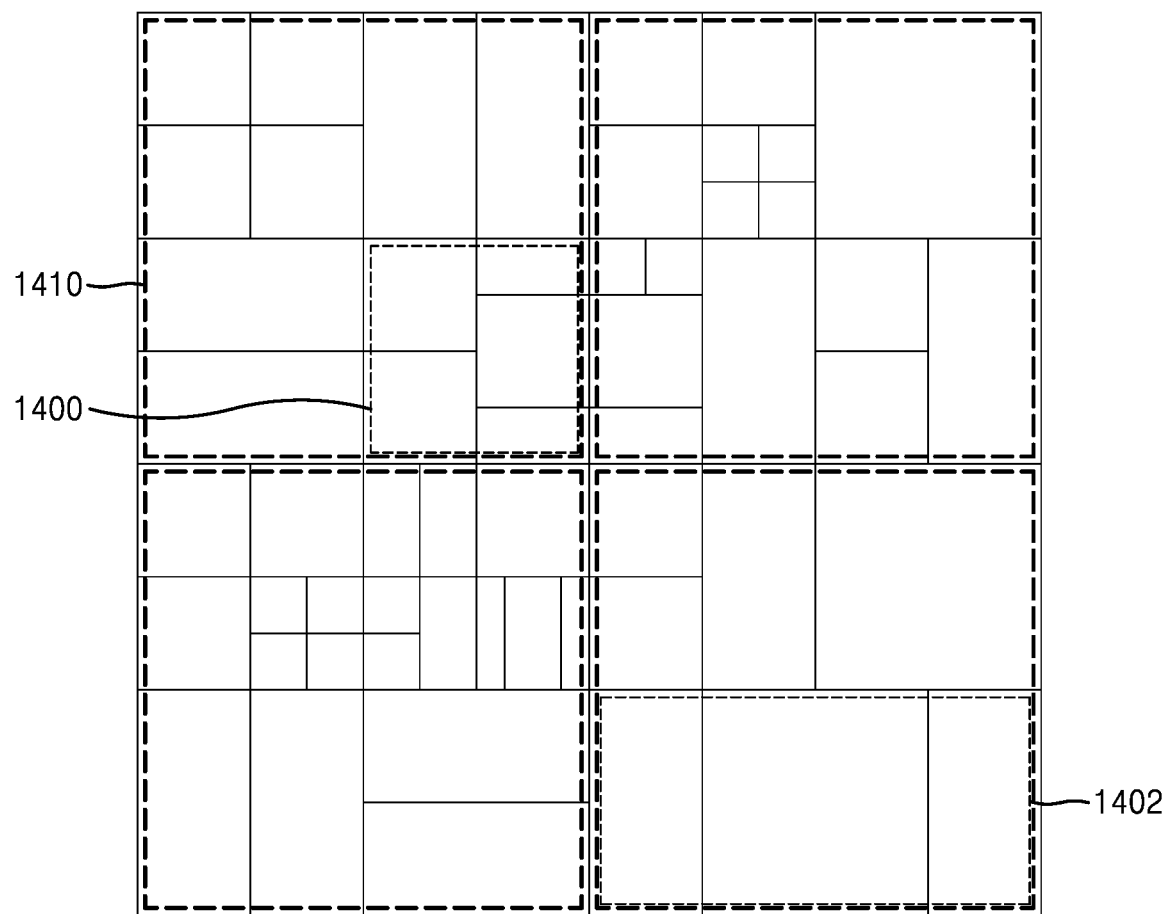
FIG. 14 illustrates that a plurality of coding units are determined based on a plurality of preset data units included in a picture, according to an embodiment.

FIG. 14 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and split shape information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split the current picture into a plurality of reference data units. According to an embodiment, the image decoding apparatus 150 may split the plurality of reference data units, which are split from the current picture, by using splitting information about each reference data unit. The operation of splitting the reference data unit may correspond to a splitting operation using a quadtree structure.

According to an embodiment, the image decoding apparatus 150 may previously determine the minimum size allowed for the reference data units included in the current picture. Accordingly, the image decoding apparatus 150 may determine various reference data units having sizes equal to or greater than the minimum size, and may determine one or more coding units by using the block shape information and the split shape information with reference to the determined reference data unit.

Referring to FIG. 14, the image decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding apparatus 150 may obtain, from a bitstream, at least one of reference coding unit shape information and reference coding unit size information with respect to each of the various data units. An operation of splitting the square reference coding unit 1400 into one or more coding units has been described above in relation to the operation of splitting the current coding unit 1000 of FIG. 10, and an operation of splitting the non-square reference coding unit 1402 into one or more coding units has been described above in relation to the operation of splitting the current coding unit 1100 or 1150 of FIG. 11. Thus, detailed descriptions thereof will not be provided herein.

According to an embodiment, the image decoding apparatus 150 may use a PID for identifying the size and shape of reference coding units, to determine the size and shape of reference coding units according to some data units previously determined based on a preset condition. That is, the receiver 160 may obtain, from the bitstream, only the PID for identifying the size and shape of reference coding units with respect to each slice, slice segment, or largest coding unit which is a data unit satisfying a preset condition (e.g., a data unit having a size equal to or smaller than a slice) among the various data units (e.g., sequences, pictures, slices, slice segments, largest coding units, or the like). The image decoding apparatus 150 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 15:
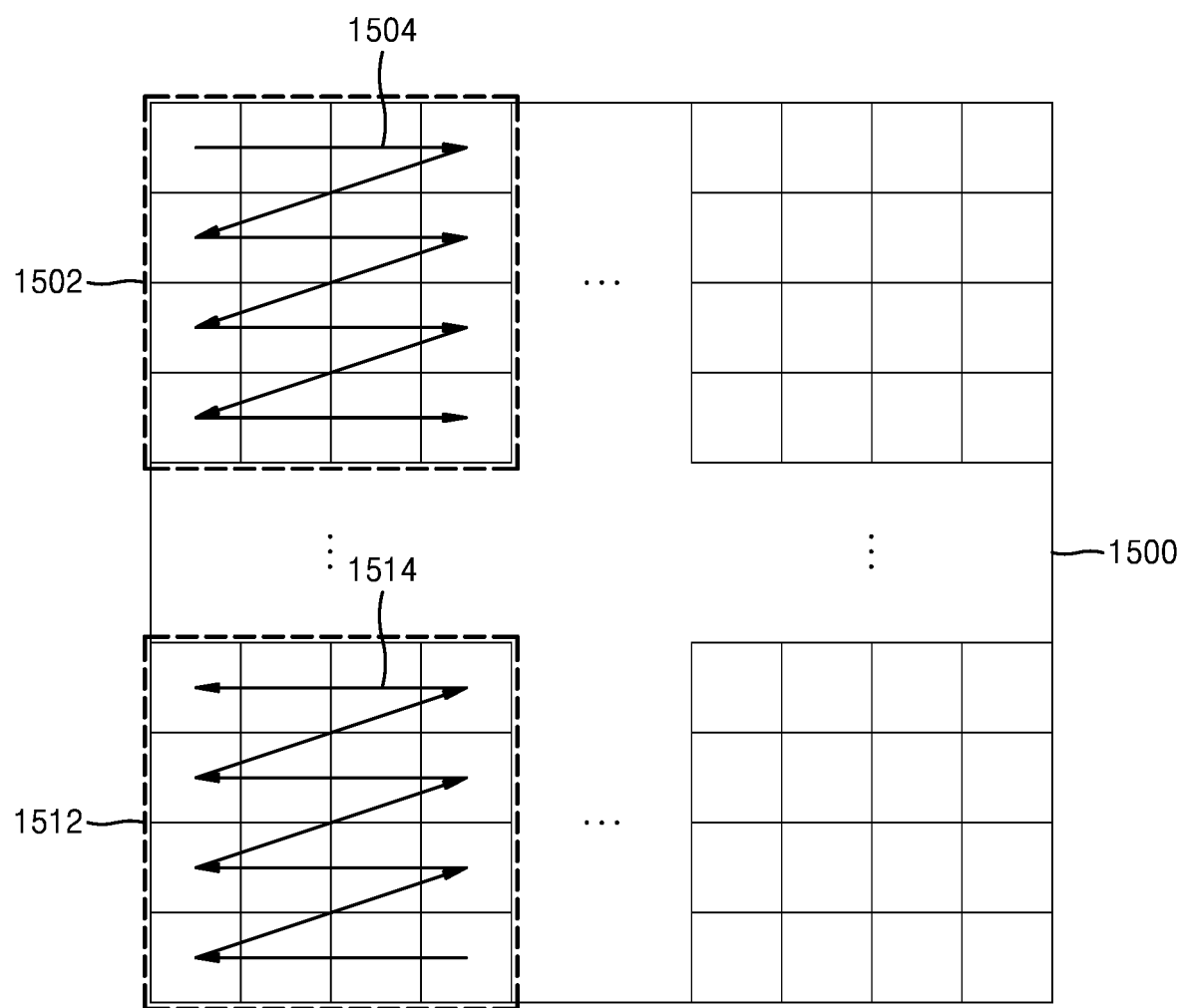
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500, according to an embodiment.

According to an embodiment, the image decoding apparatus 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the picture. The image decoding apparatus 150 may obtain the processing block size information from a bitstream and may determine the size of one or more processing blocks included in the picture. The size of processing blocks may be a preset size of data units, which is indicated by the processing block size information.

According to an embodiment, the receiver 160 of the image decoding apparatus 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the image decoding apparatus 150 may determine the size of one or more processing blocks, which are split from the picture, by using the obtained processing block size information. The size of the processing blocks may be integer times that of the reference coding units.

According to an embodiment, the image decoding apparatus 150 may determine the size of processing blocks 1502 and 1512 included in the picture 1500. For example, the image decoding apparatus 150 may determine the size of processing blocks based on the processing block size information obtained from the bitstream. Referring to FIG. 15, according to an embodiment, the image decoding apparatus 150 may determine a width of the processing blocks 1502 and 1512 to be four times the width of the reference coding units, and may determine a height of the processing blocks 1502 and 1512 to be four times the height of the reference coding units. The image decoding apparatus 150 may determine a determination order of one or more reference coding units in one or more processing blocks.

According to an embodiment, the image decoding apparatus 150 may determine the processing blocks 1502 and 1512, which are included in the picture 1500, based on the size of processing blocks, and may determine a determination order of one or more reference coding units in the processing blocks 1502 and 1512. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 150 may determine one or more reference coding units based on the determined determination order.

According to an embodiment, the receiver 160 may obtain the determination order information of reference coding units from the bitstream as information related to the processing blocks 1502 and 1512, and the image decoding apparatus 150 may determine a determination order of one or more reference coding units included in the processing blocks 1502 and 1512 and determine one or more reference coding units, which are included in the picture 1500, based on the determination order. Referring to FIG. 15, the image decoding apparatus 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order.

FIGS. 1 to 15 illustrate a method of splitting an image into a largest coding unit, and splitting the largest coding unit into coding units of a hierarchical tree structure. FIGS. 16 to 24 illustrate a method of determining a quantization parameter of a current block.

The image encoding apparatus 100 of FIG. 1 may transform, through a preset procedure, residual data that is a difference between original values of pixels included in a coding unit and prediction values thereof. In this regard, the image encoding apparatus 100 may reduce a size of the residual data, instead of losing the residual data by quantizing the transformed residual data.

The quantization of the residual data is performed based on a quantization parameter. The quantization parameter denotes an index used to derive a scaling matrix necessary to quantize the residual data of the current block. When the quantization parameter is large, a scaling matrix where elements are relatively large is derived. Therefore, when the quantization parameter is large, the residual data is lost in large quantities but a compression rate of the residual data is increased. On the contrary, when the quantization parameter is small, a scaling matrix where elements are relatively small is derived. Therefore, when the quantization parameter is small, the residual data is lost in small quantities but a compression rate of the residual data is decreased.

That is, in a case where subjective image quality deterioration is small even when the compression rate of the residual data is increased, a large quantization parameter may be used. However, in a case where subjective image quality deterioration is detected when the compression rate of the residual data is increased, a small quantization parameter has to be used. Therefore, different quantization parameters have to be used for blocks of a same picture, in consideration of deterioration in image quality.

Figure 16:
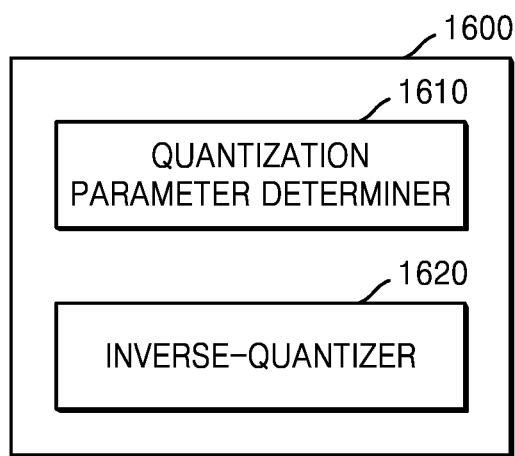
FIG. 16 illustrates an image decoding apparatus for determining a quantization parameter of a block and decoding residual data of the block according to the determined quantization parameter.

FIG. 16 illustrates an image decoding apparatus for determining a quantization parameter of a block and decoding residual data of the block according to the determined quantization parameter.

An image decoding apparatus 1600 includes a quantization parameter determiner 1610 and an inverse-quantizer 1620. In FIG. 16, the quantization parameter determiner 1610 and the inverse-quantizer 1620 are illustrated as separate components but, in another embodiment, the quantization parameter determiner 1610 and the inverse-quantizer 1620 may be combined into one component.

In FIG. 16, the quantization parameter determiner 1610 and the inverse-quantizer 1620 are illustrated as being included in one apparatus but devices performing respective functions of the quantization parameter determiner 1610 and the inverse-quantizer 1620 may not be necessarily physically adjacent to each other. Therefore, in another embodiment, the quantization parameter determiner 1610 and the inverse-quantizer 1620 may be dispersed.

The quantization parameter determiner 1610 and the inverse-quantizer 1620 may be implemented by one processor according to an embodiment. In another embodiment, the quantization parameter determiner 1610 and the inverse-quantizer 1620 may be implemented by a plurality of processors.

The image decoding apparatus 1600 may perform inverse quantization based on a quantization group including one or more blocks. Hereinafter, an inverse quantization method based on a quantization group will now be described.

When a quantization parameter varies in each block, information about the quantization parameter is increased. Therefore, when a quantization parameter is determined with respect to a block unit, coding efficiency may be decreased. Therefore, in order to increase coding efficiency, a method of determining a same quantization parameter with respect to a plurality of blocks is being discussed.

In general, adjacent blocks have same or similar quantization parameters. Therefore, the image decoding apparatus 1600 may use a same quantization parameter for adjacent blocks. A plurality of blocks that are adjacent to each other and use a same quantization parameter are referred to as a quantization group.

The quantization group may be determined based on a largest coding unit. For example, the quantization group may be set with respect to blocks split from the largest coding unit by the preset number of times. When a block for which a quantization group is set is not additionally split, a quantization parameter of the quantization group is applied to only the block for which the quantization group is set. On the contrary, when the block corresponding to the quantization group is additionally split, the quantization parameter of the quantization group may be applied to all subblocks that are generated by splitting the block for which the quantization group is set.

Alternatively, the quantization group may be determined based on a size. For example, when a size of a block is equal to or smaller than a quantization group reference size, a quantization group may be set for the block. When the block for which the quantization group is set is not additionally split, a quantization parameter of the quantization group is applied to only one block for which the quantization group is set. On the contrary, the block corresponding to the quantization group is additionally split, the quantization parameter of the quantization group may be applied to all subblocks that are generated by splitting the block for which the quantization group is set. Accordingly, a quantization parameter of blocks is determined based on a quantization block, such that information about the quantization parameter is decreased.

The quantization parameter determiner 1610 may obtain a difference quantization parameter allowance flag with respect to an upper data unit of a current quantization group. When the difference quantization parameter allowance flag indicates that it is allowed to determine a quantization parameter according to a difference quantization parameter, the quantization parameter determiner 1610 may obtain the difference quantization parameter of a current block.

The upper data unit may be one of a video parameter set (VPS), a sequence parameter set (SPS), and a picture parameter set (PPS). Therefore, the quantization parameter determiner 1610 may apply a method of determining a quantization parameter based on a quantization group to all blocks included in an upper data unit.

The quantization parameter determiner 1610 may obtain quantization group information with respect to an upper data unit of a current quantization group. The quantization group information indicates a method of determining a quantization group. For example, the quantization group information may include block split information or block size information. When the difference quantization parameter allowance flag allows a difference quantization parameter, the quantization parameter determiner 1610 may obtain the quantization group information.

The quantization parameter determiner 1610 may determine a predicted quantization parameter of the current quantization group, the predicted quantization parameter being determined according to at least one of the block split information and the block size information.

The block split information may include the number of quadtree splitting times and the number of non-quadtree splitting times. The number of quadtree splitting times indicates the number of times a quadtree split is performed to obtain a current quantization group from a largest coding block. For example, a split to blocks 210d of FIG. 2 corresponds to a quadtree split.

The number of non-quadtree splitting times indicates the number of times a split that is not the quadtree split is performed to obtain a current quantization group from a largest coding block. For example, a splitting method shown in FIG. 3 corresponds to the non quadtree split.

The block size information may include an area of a block or a binary logarithm (log) value of the area of the block. Also, a height and width of the block or binary log values of the height and width of the block may be included therein.

According to an embodiment, the quantization parameter determiner 1610 may determine the current quantization group according to the number of quadtree splitting times. When only the quadtree split is used to split a largest coding unit, a quantization group may be set with respect to a block having at least preset size according to the number of quadtree splitting times. For example, when a size of the largest coding unit is 256×256 and the number of quadtree splitting times is 2, the quantization group may be set for a block whose size is 64×64 or more.

FIGS. 17A to 17D are diagrams of embodiments in which a quantization group is determined according to the number of quadtree splitting times.

Figure 17A:
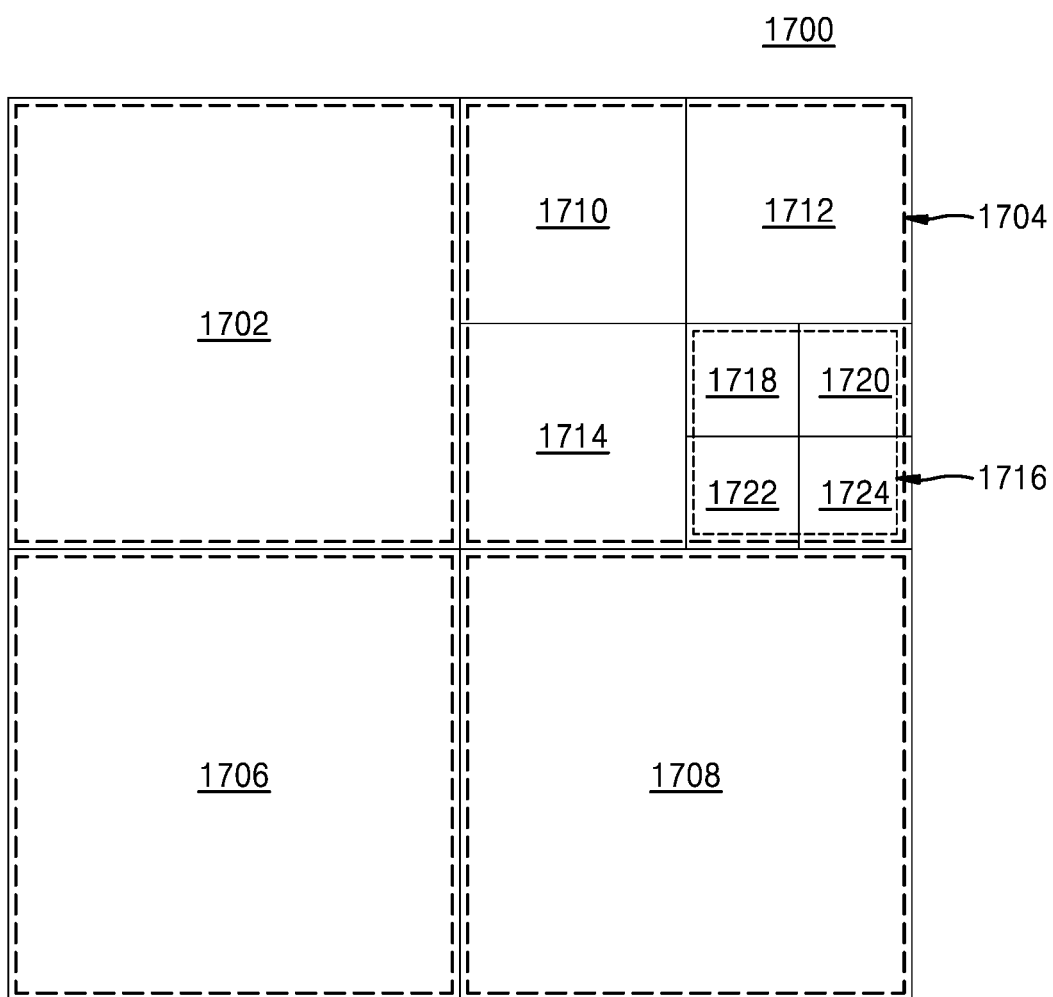
FIGS. 17A to 17D are diagrams of embodiments in which a quantization group is determined according to the number of quadtree splitting times.

Referring to FIG. 17A, a largest coding block 1700 is split into four blocks 1702, 1704, 1706, and 1708 according to quadtree split. The number of quadtree splitting times of the blocks 1702, 1704, 1706, and 1708 is set to 1. The block 1704 is split into four blocks 1710, 1712, 1714, and 1716 according to quadtree split. The number of quadtree splitting times of the blocks 1710, 1712, 1714, and 1716 is set to 2. The block 1716 is split into four blocks 1718, 1720, 1722, and 1724 according to quadtree split. The number of quadtree splitting times of the blocks 1718, 1720, 1722, and 1724 is set to 3. Based on the blocks 1702, 1706, 1708, 1710, 1712, 1714, 1718, 1720, 1722, and 1724 determined when a split of the largest coding block 1700 is completed, prediction and transformation encoding and decoding may be performed.

As shown in FIG. 17A, when the number of quadtree splitting times is increased by 1, a size of a split block is decreased by a half. Therefore, only when quadtree split is allowed, a size of a block may be determined according to the number of quadtree splitting times.

Figure 17B:
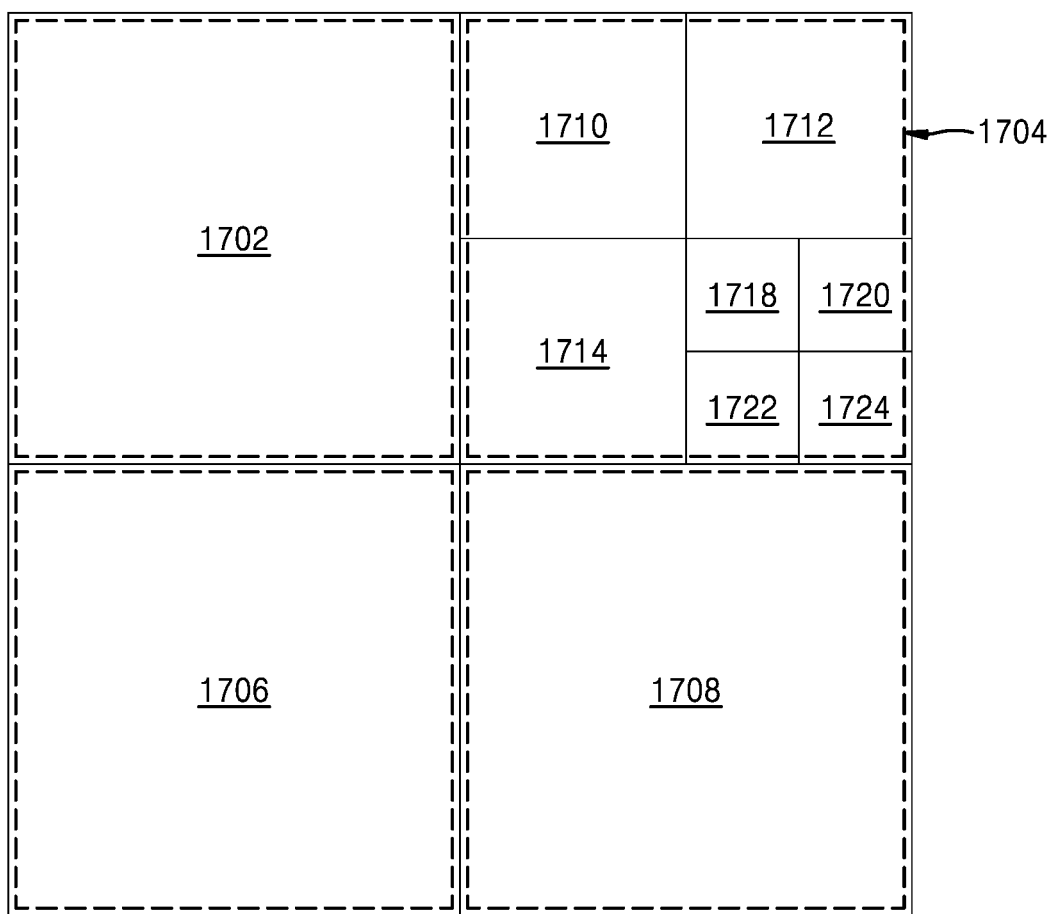

FIG. 17B illustrates an embodiment in which a quantization group is determined with respect to a block for which the number of quadtree splitting times is 1. Referring to FIG. 17B, quantization groups are set with respect to four blocks 1702, 1704, 1706, and 1708 for which the number of quadtree splitting times is 1.

Each of the blocks 1702, 1706, and 1708 is solely included in each of the quantization groups for the blocks 1702, 1706, and 1708. However, the quantization group of the block 1704 includes subblocks 1710, 1712, 1714, 1718, 1720, 1722, and 1724 of the block 1704. Therefore, quantization and inverse quantization according to a same quantization parameter may be applied to the subblocks 1710, 1712, 1714, 1718, 1720, 1722, and 1724 of the block 1704.

Figure 17C:
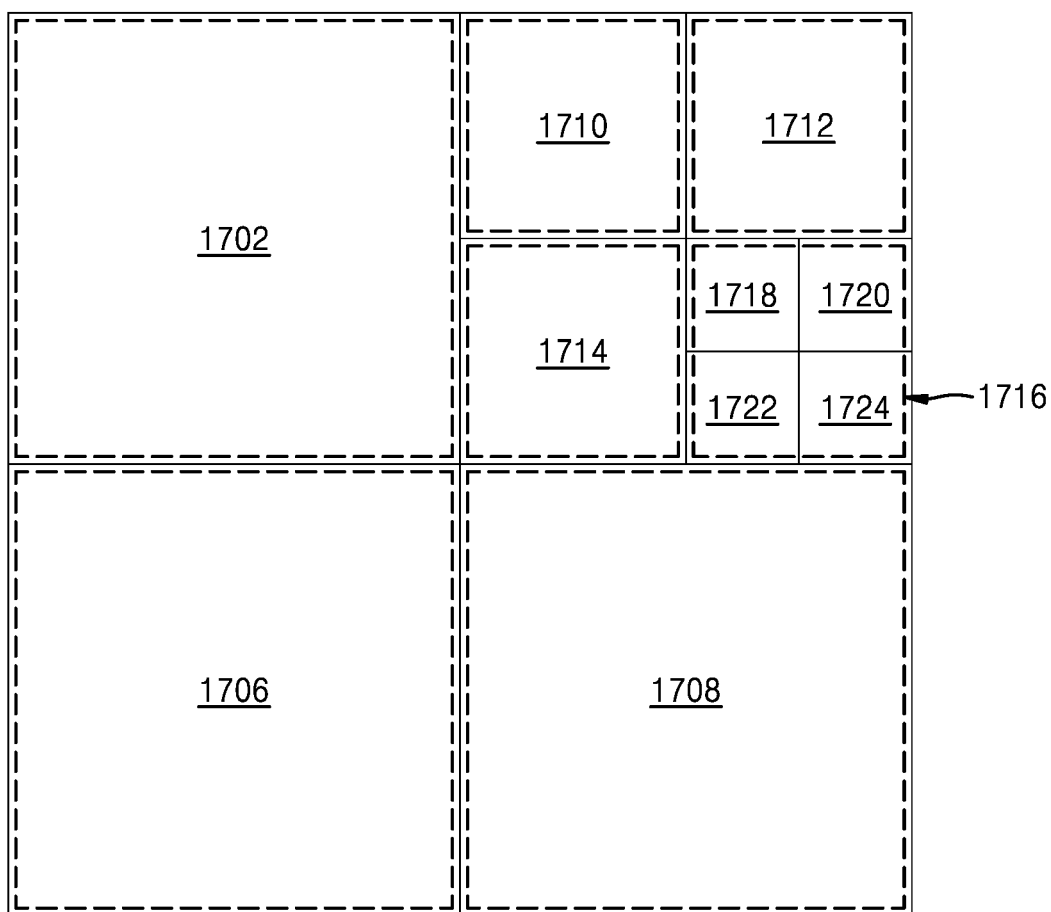

FIG. 17C illustrates an embodiment in which a quantization group is determined with respect to a block for which the number of quadtree splitting times is 2. Referring to FIG. 17C, quantization groups are set with respect to blocks 1702, 1706, 1708, 1710, 1712, 1714, and 1716 for which the number of quadtree splitting times is equal to or smaller than 2. For the blocks 1702, 1706, and 1708, the number of quadtree splitting times is 1 but the blocks 1702, 1706, and 1708 are not additionally split, such that the quantization group is set with respect the blocks 1702, 1706, and 1708.

Each of the blocks 1702, 1706, 1708, 1710, 1712, and 1714 is solely included in each of the quantization groups therefor. However, the quantization group of the block 1716 includes subblocks 1718, 1720, 1722, and 1724 of the block 1716. Therefore, quantization and inverse quantization according to a same quantization parameter may be applied to the subblocks 1718, 1720, 1722, and 1724 of the block 1716.

Figure 17D:
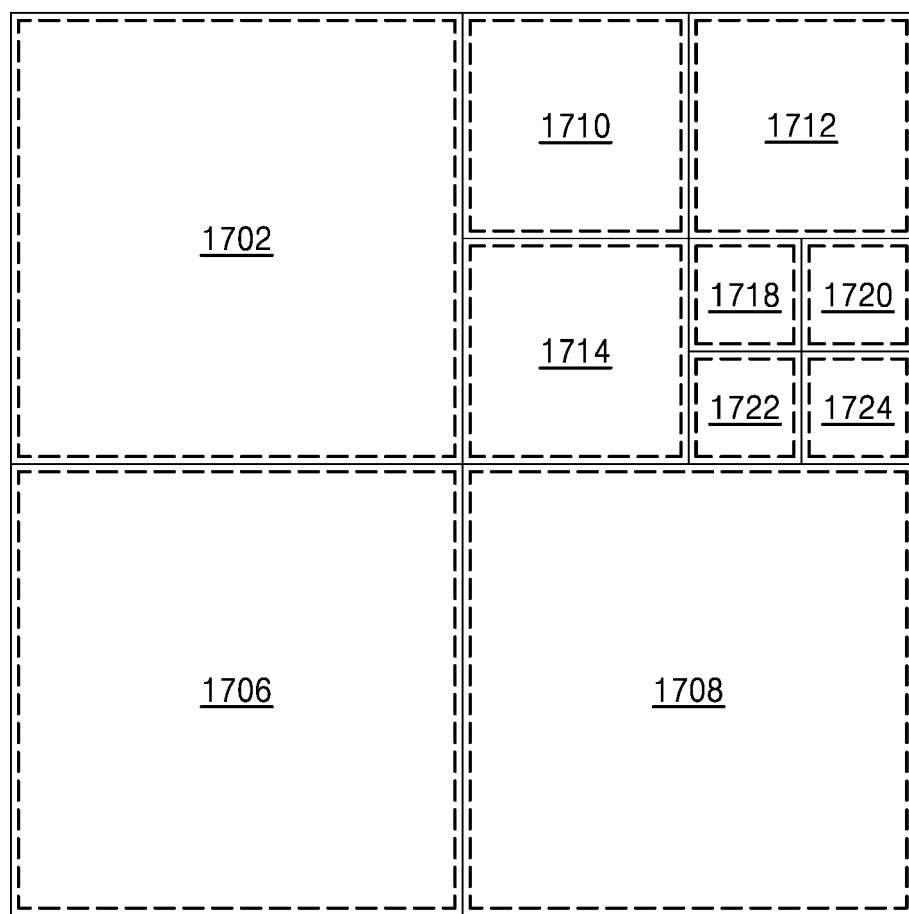

FIG. 17D illustrates an embodiment in which a quantization group is determined with respect to a block for which the number of quadtree splitting times is 3. Because a block for which the number of quadtree splitting times is 4 is not present in FIG. 17D, a quantization group is set with respect to all blocks 1702, 1706, 1708, 1710, 1712, 1714, 1718, 1720, 1722, and 1724.

Referring to FIGS. 17A to 17D, when the number of quadtree splitting times of block split information is increased, a size of a quantization group is decreased. On the contrary, when the number of quadtree splitting times of the block split information is decreased, the size of the quantization group is increased. Therefore, a size of quantization parameter information may be increased or decreased based on the number of quadtree splitting times of block split information.

Figure 18A:
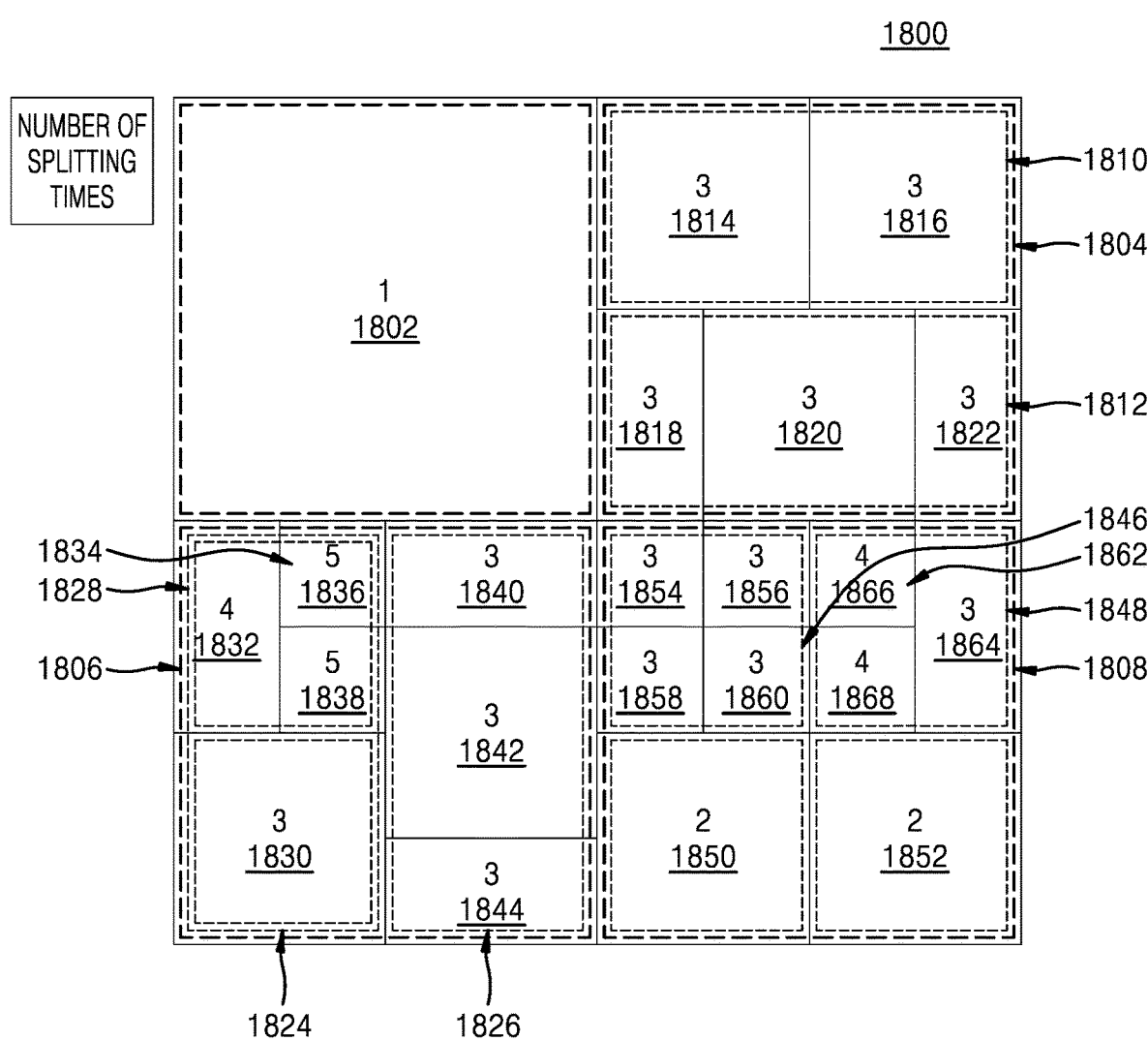
FIGS. 18A to 18C illustrate an embodiment of a method of determining a quantization group in a largest coding block to which non quadtree split is applied.
Figure 18B:
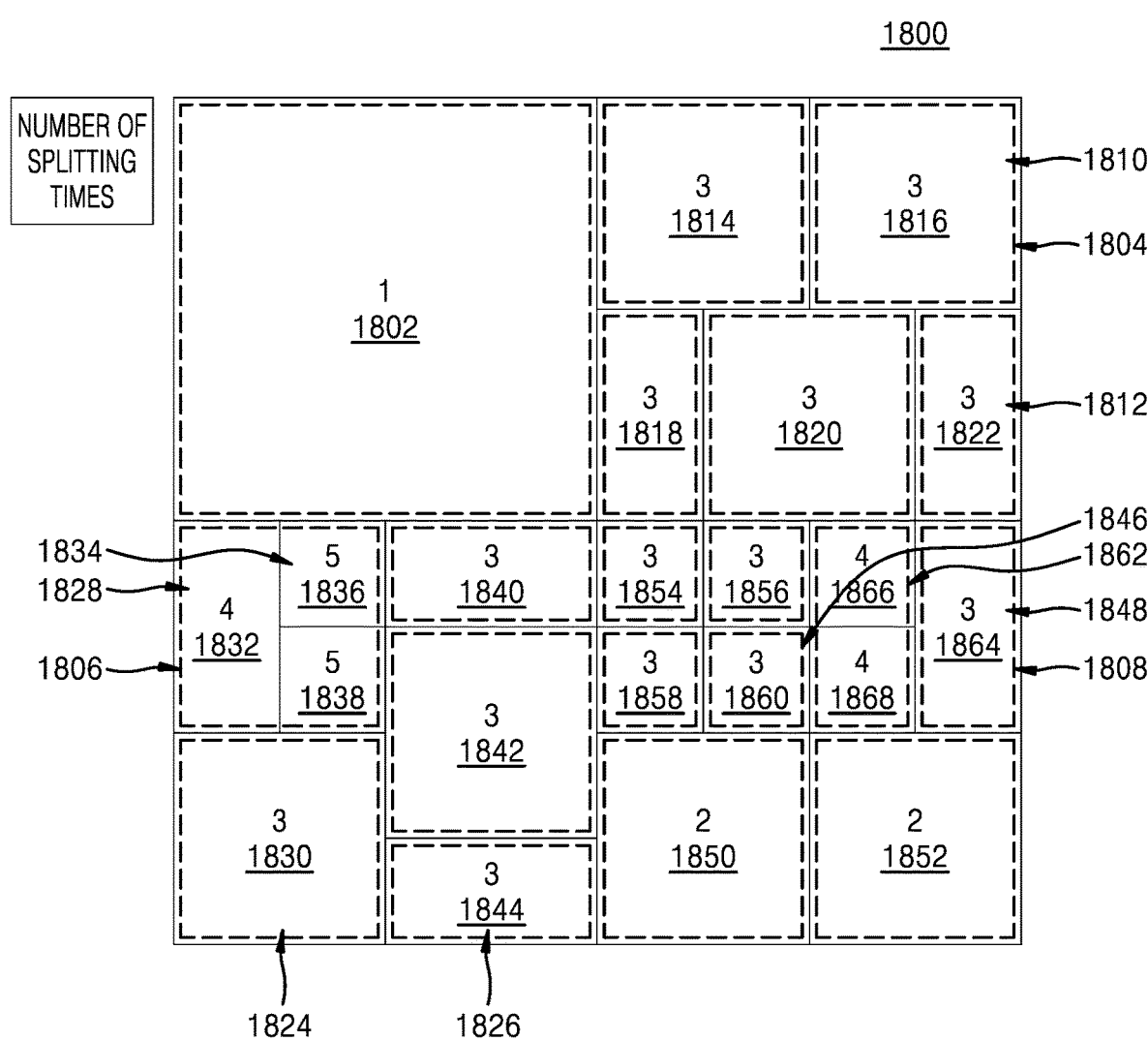
Figure 18C:
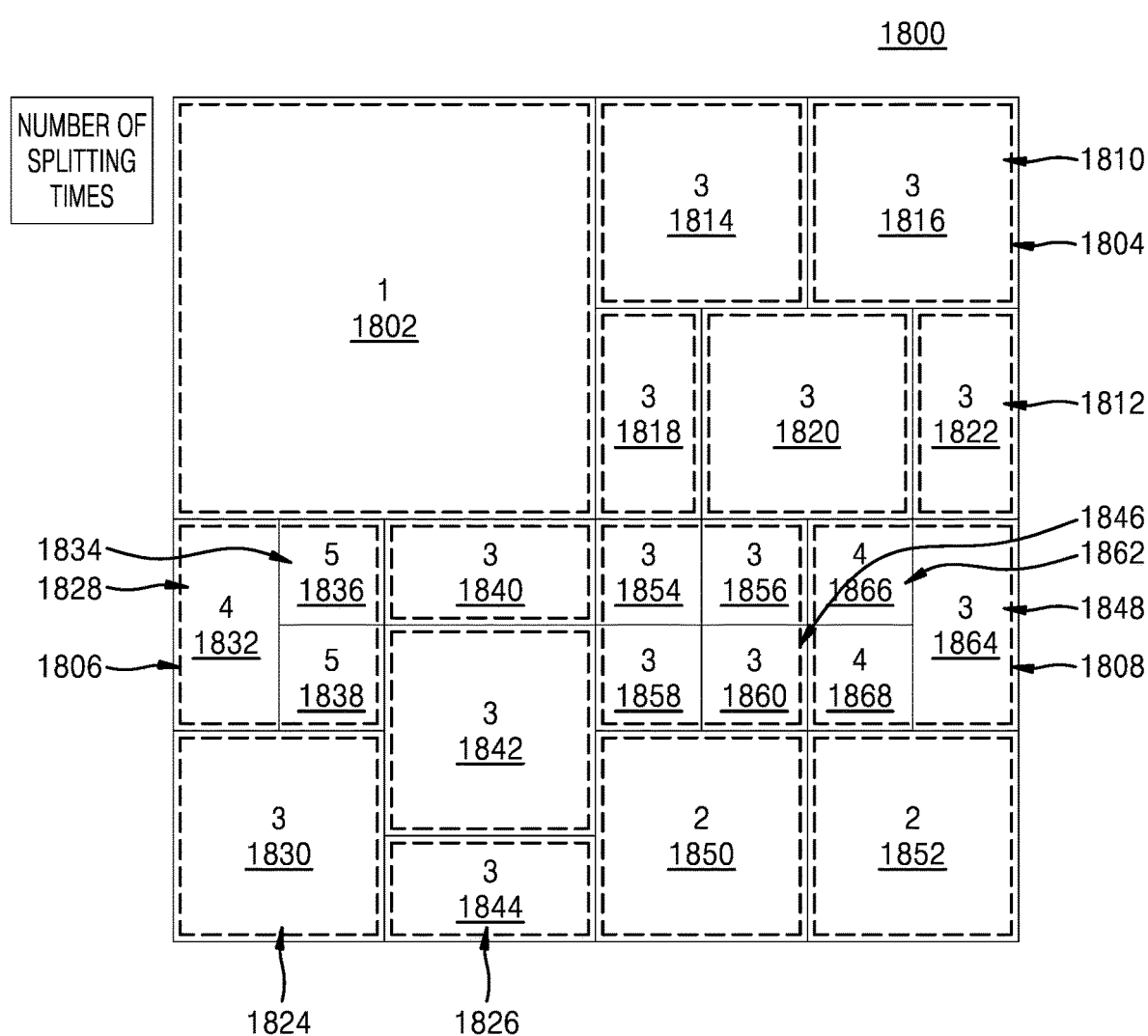

The quantization parameter determiner 1610 may determine a current quantization group according to the number of quadtree splitting times and the number of non-quadtree splitting times. When both quadtree split and non quadtree split are applied to splitting of blocks, the method of determining a quantization group shown in FIGS. 17A to 17D is not used. Therefore, a quantization group may be determined, in further consideration of the number of non-quadtree splitting times, or a method of determining a quantization group based on a size of the quantization group may be applied thereto. FIGS. 18A to 18C illustrate an embodiment of a method of determining a quantization group in a largest coding block to which non quadtree split is applied.

FIG. 18A illustrates how a largest coding block 1800 is split. A number marked in each block indicates the number of splitting times performed on the largest coding block 1800.

The largest coding block 1800 is quadtree split into four blocks 1802, 1804, 1806, and 1808. Because the block 1802 is not additionally split, the number of splitting times of the block 1802 is 1. Hereinafter, it is assumed that a size of the largest coding block 1800 is 4N×4N.

The block 1804 is split into two 2N×N blocks 1810 and 1812. Then, the block 1810 is split into two N×N blocks 1814 and 1816, and the block 1812 is split into two N/2×N blocks 1818 and 1822 and one N×N block 1820. The number of splitting times of subblocks 1814, 1816, 1818, 1820, 1822 of the block 1804 is all 3.

The block 1806 is split into two N×2N blocks 1824 and 1826. Then, the block 1824 is split into two N×N blocks 1828 and 1830, and the block 1826 is split into two N×N/2 blocks 1840 and 1844 and one N×N block 1842. The block 1828 is split into two N/2×N blocks 1832 and 1834. The block 1834 is split into two N/2×N/2 blocks 1836 and 1838. The number of splitting times of subblocks 1828, 1830, 1840, 1842, and 1844 of the block 1806 is 3. The number of splitting times of the block 1832 split from the block 1828 is 4, and the number of splitting times of the blocks 1836 and 1838 is 5.

The block 1808 is split into four N×N blocks 1846, 1848, 1850, and 1852. The block 1846 is split into four N×N blocks 1854, 1856, 1858, and 1860. Also, the block 1848 is split into two N×2N blocks 1862 and 1864, and the block 1862 is split into two N×N blocks 1866 and 1868. The number of splitting times of the blocks 1850 and 1852 is 2, and the number of splitting times of the blocks 1854, 1856, 1858, 1860, and 1864 is 3. The number of splitting times of the blocks 1866 and 1868 is 4.

When a quantization group is determined according to the number of splitting times of a block, a size of the quantization group may not be uniform. In detail, with reference to FIG. 18B, ununiformity in a size of a quantization group will now be described.

FIG. 18B illustrates an embodiment in which a quantization group is set with respect to blocks whose number of splitting times is 3. Referring to FIG. 18B, a quantization group is set with respect to blocks 1802, 1814, 1816, 1818, 1820, 1822, 1828, 1830, 1840, 1842, 1844, 1850, 1852, 1854, 1856, 1858, 1860, 1862, and 1864 whose number of splitting times is 3.

However, the number of splitting times of the block 1814 and the number of splitting times of the block 1854 are equal, but a size of the block 1814 is four times a size of the block 1854. Although a size of the 1836 is equal to a size of the 1854, a quantization parameter of a quantization group corresponding to the block 1828 is applied whereas a quantization parameter of a quantization group corresponding to the block 1854 is applied the block 1854.

Only when quadtree split is performed as in embodiments of FIGS. 17A to 17D, sizes of quantization groups are same.

However, as described above, in a case where quantization groups are set according to the number of splitting times when non-quadtree split is performed, sizes of the quantization groups are different.

FIG. 18C illustrates methods for solving the problem. For example, the quantization parameter determiner 1610 may determine a current quantization group according to a weighted sum of the number of quadtree splitting times and the number of non-quadtree splitting times. Quadtree split is the same as that vertical split and horizontal split are sequentially applied. Therefore, one quadtree split is substantially the same as two non-quadtree splits.

Therefore, the quantization parameter determiner 1610 subdivides the number of splitting times into the number of quadtree splitting times and the number of non-quadtree splitting times, and may set a quantization group based on a weighted sum of the number of quadtree splitting times and the number of non-quadtree splitting times according to a weight of 2:1.

For example, the block 1814 is generated due to one quadtree split and two non-quadtree splits from a largest coding unit 1800. Therefore, a weighted sum of the number of quadtree splitting times and the number of non-quadtree splitting times according to a weight of 2:1 with respect to the block 1814 is 4. The block 1846 is generated due to two quadtree splits from the largest coding unit 1800. Therefore, a weighted sum of the number of quadtree splitting times and the number of non-quadtree splitting times according to a weight of 2:1 with respect to the block 1846 is 4. Therefore, when a quantization group is set with respect to a block whose weighted sum is 4, unlike FIG. 18B, in FIG. 18C, a block 1854 obtains a quantization parameter from a quantization group set for the block 1846.

According to another embodiment, the quantization parameter determiner 1610 may determine a current quantization group based on a sum of a height and a width of a block or an average of the height and the width of the block. For example, when a quantization group is set with respect to a block with an N×N size, quantization groups are set with respect to the block 1814 and the block 1846. Therefore, unlike FIG. 18B, in FIG. 18C, the block 1854 obtains a quantization parameter from the quantization group set for the block 1846. Because upper blocks 1812 and 1826 are larger than an N×N size and thus there is no quantization group corresponding thereto, even when blocks 1818, 1822, 1840, and 1844 are smaller than the N×N size, quantization groups are set therefor.

Similarly, the quantization parameter determiner 1610 may determine a current quantization group based on a sum of binary log values of a height and a width of a block or an average of binary log values of the height and the width of the block. Alternatively, the quantization parameter determiner 1610 may determine a current quantization group based on an area of a block or a binary log value of the area.

The quantization parameter determiner 1610 may determine a predicted quantization parameter of a current block, based on a quantization parameter of an upper adjacent block of a current quantization group, a quantization parameter of a left adjacent block of the current quantization group, and a quantization parameter of a quantization group that has been decoded just before the current quantization group.

For example, the quantization parameter determiner 1610 may determine, as a quantization parameter of the current quantization group, an average of the quantization parameter of the upper adjacent block and the quantization parameter of the left adjacent block. When the quantization parameter of the upper adjacent block does not exist, the quantization parameter determiner 1610 may use, instead of the quantization parameter of the upper adjacent block, the quantization parameter of the quantization group, which has been decoded just before the current quantization group, to determine the quantization parameter of the current quantization group. Equally, when the quantization parameter of the left adjacent block does not exist, the quantization parameter determiner 1610 may use, instead of the quantization parameter of the left adjacent block, the quantization parameter of the quantization group, which has been decoded just before the current quantization group, to determine the quantization parameter of the current quantization group.

Also, the quantization parameter determiner 1610 may determine a default quantization parameter of a slice or picture as a predicted quantization parameter. For example, when the quantization parameter of the upper adjacent block, the quantization parameter of the left adjacent block, and the quantization parameter of the quantization group that has been decoded just before the current quantization group, the current quantization group refers to, do not exist, the default quantization parameter may be used.

The quantization parameter determiner 1610 determines a difference quantization parameter of the current quantization group. The quantization parameter determiner 1610 may obtain, from a bitstream, difference quantization parameter magnitude information and difference quantization parameter sign information. The quantization parameter determiner 1610 may determine the difference quantization parameter of the current quantization group, based on the difference quantization parameter magnitude information and the difference quantization parameter sign information.

When the current quantization group includes two or more blocks, the quantization parameter determiner 1610 may obtain the difference quantization parameter magnitude information and the difference quantization parameter sign information with respect to a block to be first decoded in a scan order. Then, the quantization parameter determiner 1610 does not obtain the difference quantization parameter magnitude information and the difference quantization parameter sign information with respect to remaining blocks of the current quantization group, and applies a quantization parameter to the remaining blocks, the quantization parameter being determined with respect to the block to be first decoded. Therefore, as a result, the quantization parameter determiner 1610 applies the same quantization parameter to all blocks of the current quantization group.

When the quantization parameter determiner 1610 decodes all blocks of the current quantization group, and then decodes a block of a new quantization group, the quantization parameter determiner 1610 may initialize a difference quantization parameter and difference quantization parameter-related information. The difference quantization parameter-related information may include difference quantization parameter decoding information indicating whether the difference quantization parameter has been already decoded, and quantization group position information indicating a position of a quantization group.

The quantization parameter determiner 1610 may initialize the difference quantization parameter and the difference quantization parameter-related information, and may obtain new difference quantization parameter magnitude information and new difference quantization parameter sign information from a bitstream.

The quantization parameter determiner 1610 determines a quantization parameter of the current quantization group, based on the predicted quantization parameter and the difference quantization parameter of the current quantization group. In detail, the quantization parameter determiner 1610 may determine the quantization parameter, based on a sum of the predicted quantization parameter and the difference quantization parameter of the current quantization group. According to an embodiment, the quantization parameter determiner 1610 may obtain quantization parameter offset information from a bitstream, and may adjust the determined quantization parameter according to the quantization parameter offset information.

The inverse-quantizer 1620 inverse quantizes the current block included in the current quantization group, based on the quantization parameter of the current quantization group.

FIG. 19 illustrates a syntax structure about a method of decoding a difference quantization parameter included in a bitstream when quadtree split and non-quadtree split are all allowed.

Table in the top of FIG. 19 shows quadtree split syntax structure (coding_quadtree). The quadtree split syntax structure of FIG. 19 provides a configuration of determining whether to initialize a difference quantization parameter and difference quantization parameter-related information before whether to perform quadtree split is determined.

In the quadtree split syntax structure of FIG. 19, "cu_qp_delta_enabled_flag" indicates a difference quantization parameter-enabled flag, "cqtDepth" indicates the number of quadtree splitting times, and "diff_cu_qp_delta_depth" indicates block split information. "CuQpDeltaVal" indicates a difference quantization parameter, "IsCuQpDeltaCoded" indicates difference quantization parameter decoding information, and "CuQgTopLeftX" and "CuQgTopLeftY" indicate quantization group position information.

Referring to FIG. 19, when "cu_qp_delta_enabled_flag" indicates 1 and "cqtDepth" is equal to or smaller than "diff_cu_qp_delta_depth", "CuQpDeltaVal" and "IsCuQpDeltaCoded" are determined to be 0, and "CuQgTopLeftX" and "CuQgTopLeftY" are determined as x0 and y0 that indicate an upper-left sample position of a current block.

When "cu_qp_delta_enabled_flag" indicates 1, this means that it is allowed to obtain a difference quantization parameter.

When "cqtDepth" is equal to or smaller than "diff_cu_qp_delta_depth", this means that the number of quadtree splitting times of the current block is equal to or smaller than the number of splitting times that is a reference of a quantization group indicated by the block split information. The feature that the number of quadtree splitting times of the current block is equal to or smaller than the number of splitting times that is the reference of the quantization group means that the current block is not included in a quantization group of a block decoded before the current block.

When the above conditions are satisfied, "CuQpDeltaVal" and "IsCuQpDeltaCoded" are determined to be 0, and a new difference quantization parameter about a quantization group positioned at "CuQgTopLeftX" and "CuQgTopLeftY" is obtained based on difference quantization parameter information that is newly obtained from a bitstream.

Table in the middle of FIG. 19 shows non-quadtree split syntax structure. The non-quadtree split syntax structure of FIG. 19 provides a configuration of determining whether to initialize a difference quantization parameter and difference quantization parameter-related information before whether to perform non-quadtree split is determined.

In the non-quadtree split syntax structure of FIG. 19, "cu_qp_delta_enabled_flag" indicates a difference quantization parameter-enabled flag, "cqtDepth" indicates the number of quadtree splitting times, "mttDepth" indicates the number of non-quadtree splitting times, and "diff_cu_qp_delta_depth" indicates block split information. "CuQpDeltaVal" indicates a difference quantization parameter, "IsCuQpDeltaCoded" indicates difference quantization parameter decoding information, and "CuQgTopLeftX" and "CuQgTopLeftY" indicate quantization group position information.

Referring to FIG. 19, when "cu_qp_delta_enabled_flag" indicates 1 and a sum of "cqtDepth" and "mttDepth" is equal to or smaller than "diff_cu_qp_delta_depth", "CuQpDeltaVal" and "IsCuQpDeltaCoded" are determined to be 0, and "CuQgTopLeftX" and "CuQgTopLeftY" are determined as x0 and y0 that indicate an upper-left sample position of a current block.

Similar to the quadtree split syntax structure, even in the non-quadtree split syntax structure, a difference quantization parameter and difference quantization parameter-related information are initialized. However, unlike the quadtree split syntax structure, in the non-quadtree split syntax structure, the sum of "cqtDepth" and "mttDepth", instead of "cqtDepth", is compared with "diff_cu_qp_delta_depth". In FIG. 19, the sum of "cqtDepth" and "mttDepth" is compared with "diff_cu_qp_delta_depth", but, according to an embodiment, a weighted sum of "cqtDepth" and "mttDepth" may be compared with "diff_cu_qp_delta_depth".

Table in the bottom of FIG. 19 shows transform block syntax structure. tu_cbf_luma[x0][y0] indicates whether a current luma block positioned at (x0, y0) has residual data. Then, tu_cbf_cb[x0][y0] and tu_cbf_cr[x0][y0] indicate whether a current Cb block and a current Cr block respectively positioned at (x0, y0) have residual data. When the current luma block, the current Cb block, and the current Cr block do not have residual data, difference quantization parameter information is not obtained.

On the contrary, when at least one of the current luma block, the current Cb block, and the current Cr block includes residual data, "cu_qp_delta_abs" indicating difference quantization parameter magnitude information and "cu_qp_delta_sign_flag" indicating difference quantization parameter sign information are obtained from a bitstream. Then, "CuQpDeltaVal" indicating a difference quantization parameter is determined from "cu_qp_delta_abs" and "cu_qp_delta_sign_flag". Also, "IsCuQpDeltaCoded" indicating whether a difference quantization parameter exists is determined as 1.

When a block to be decoded after the current block is included in a same quantization group of the current block (i.e., when "cqtDepth" or a (weighted) sum of "cqtDepth" and "mttDepth" is greater than "diff_cu_qp_delta_depth"), "CuQpDeltaVal" and "IsCuQpDeltaCoded" are not initialized, and thus, the block to be decoded after the current block is inverse quantized according to "CuQpDeltaVal" used in a decoding procedure with respect to the current block.

In FIG. 19, a configuration of obtaining difference quantization parameter information is implemented in the transform block syntax structure, but, according to an embodiment, the configuration may be implemented in other syntax.

Figure 20:
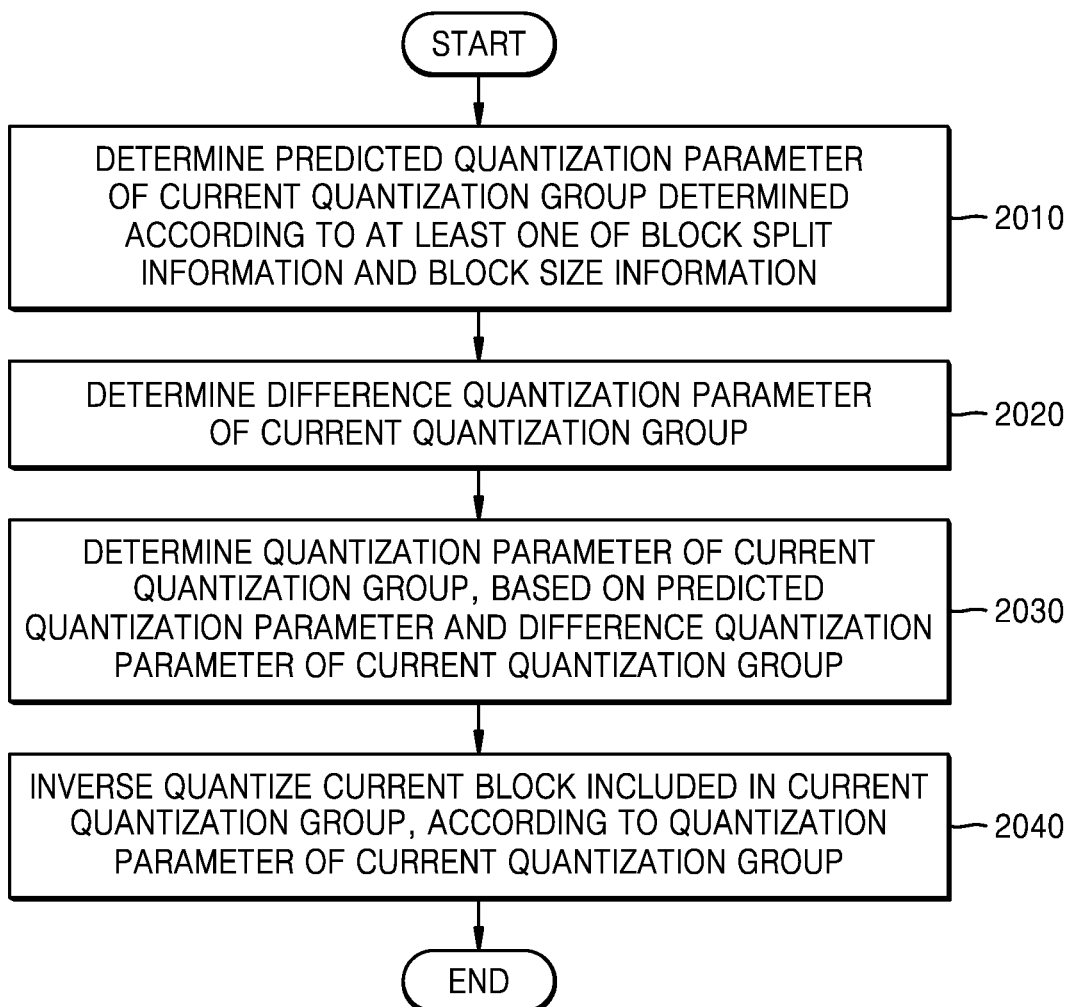
FIG. 20 illustrates an image decoding method of determining a quantization parameter of a block according to a quantization group, and decoding residual data of a block according to the determined quantization parameter.

FIG. 20 illustrates an image decoding method of determining a quantization parameter of a block according to a quantization group, and decoding residual data of a block according to the determined quantization parameter.

In operation 2010, a predicted quantization parameter of a current quantization group determined according to at least one of block split information and block size information is determined.

The current quantization group may be determined according to the number of quadtree splitting times and the number of non-quadtree splitting times. In detail, the current quantization group may be determined according to a weighted sum of the number of quadtree splitting times and the number of non-quadtree splitting times.

The current quantization group may be determined based on a sum of a height and a width of a block or an average of the height and the width of the block. Alternatively, the current quantization group may be determined based on a sum of binary log values of a height and a width of a block or an average of binary log values of the height and the width of the block. Alternatively, the current quantization group may be determined based on an area of a block or a binary log value of the area.

The predicted quantization parameter of a current block may be determined based on a quantization parameter of an upper adjacent block of a current quantization group, a quantization parameter of a left adjacent block of the current quantization group, and a quantization parameter of a quantization group that has been decoded immediately before the current quantization group.

In operation 2020, a difference quantization parameter of the current quantization group is determined. In detail, difference quantization parameter magnitude information and difference quantization parameter sign information may be obtained from a bitstream. Then, the difference quantization parameter of the current quantization group may be determined based on the difference quantization parameter magnitude information and the difference quantization parameter sign information.

According to an embodiment, when a difference quantization parameter-enabled flag indicates that it is allowed to determine a quantization parameter according to the difference quantization parameter, a difference quantization parameter of the current block may be obtained.

In operation 2030, a quantization parameter of the current quantization group is determined based on the predicted quantization parameter and the difference quantization parameter of the current quantization group. For example, the quantization parameter of the current quantization group is determined may be determined based on a sum of the predicted quantization parameter and the difference quantization parameter.

In operation 2040, the current block included in the current quantization group is inverse quantized according to the quantization parameter of the current quantization group.

The image decoding method of FIG. 20 may include various embodiments about a method of determining a quantization parameter according to a quantization group of the image decoding apparatus of FIG. 16.

The image decoding apparatus 1600 may perform inverse quantization based on a quantization parameter unit indicating an area where a same quantization parameter is used. Hereinafter, an inverse quantization method based on a quantization parameter unit will now be described.

Figure 21:
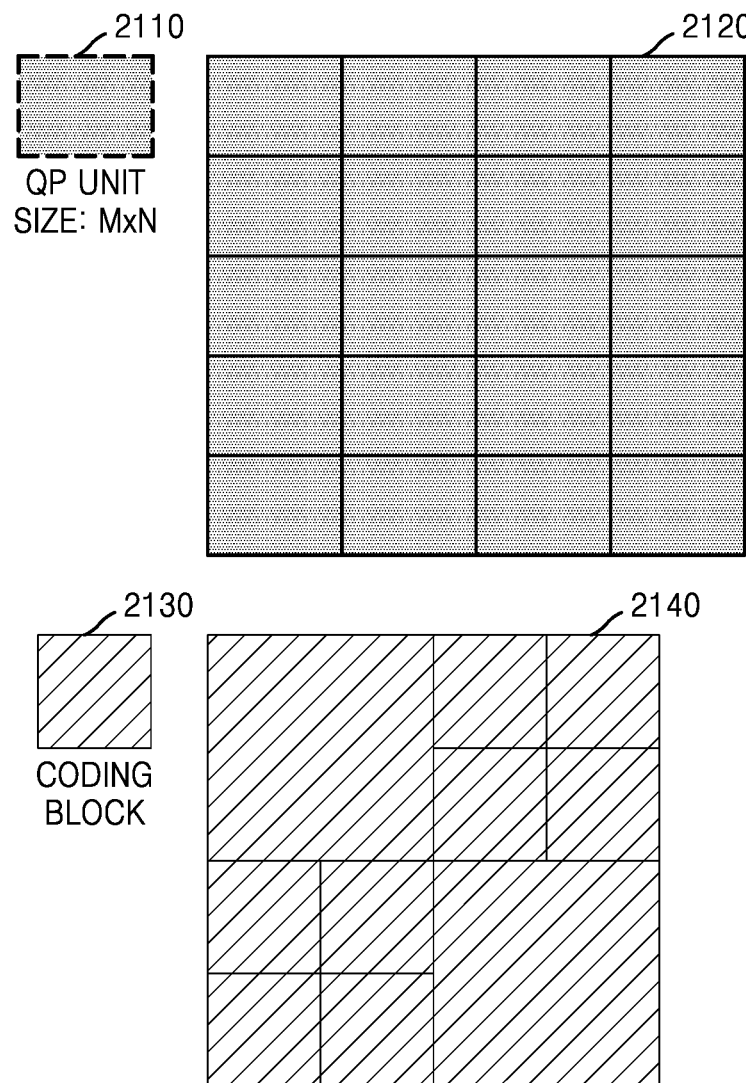
FIG. 21 illustrates an embodiment of a quantization parameter unit structure and a coding block tree structure.

FIG. 21 illustrates an embodiment of a quantization parameter unit structure and a coding block tree structure.

A picture or slice may differ in subjective image quality deterioration in their parts Therefore, for optimization of coding efficiency, it is necessary to set different quantization parameters according to characteristics of respective parts of the picture or the slice. A distribution of quantization parameters is not equal to a coding block tree structure that is a basic unit of coding. Therefore, a quantization parameter unit map is determined independently from the coding block tree structure.

In FIG. 21, a quantization parameter unit 2110 may be a rectangle of an M×N size. Here, a picture is represented as a quantization parameter map 2120 composed of a plurality of quantization parameter units. Each of the quantization parameter units in the quantization parameter map 2120 has a quantization parameter. In FIG. 21, the quantization parameter unit 2110 is illustrated as a rectangle, but, according to an embodiment, the quantization parameter unit 2110 may be illustrated as an irregular shape not the rectangle.

A quantization parameter of the quantization parameter unit 2110 may be determined according to a characteristic of a part of a corresponding picture. The quantization parameter map 2120 and the quantization parameter of the quantization parameter unit 2110 are encoded and decoded independently from prediction coding information according to a coding block structure 2140. When residual data of a coding block 2130 is encoded and decoded, a quantization parameter may be obtained from the quantization parameter unit 2110 which corresponds to a position of the coding block 2130.

The quantization parameter determiner 1610 may match a current block to a current quantization parameter unit, based on at least one of a position and a size of the current block.

For example, the quantization parameter determiner 1610 may determine, as the current quantization parameter unit of the current block, a quantization parameter unit including coordinate values of an upper-left sample of the current block.

As another example, when the current block includes a plurality of quantization parameter units, the quantization parameter determiner 1610 may determine the plurality of quantization parameter units as current quantization parameter units of the current block. In this regard, the quantization parameter determiner 1610 may determine, as a quantization parameter of the current block, an average value of a plurality of quantization parameters of the current quantization parameter units.

Figure 22A:
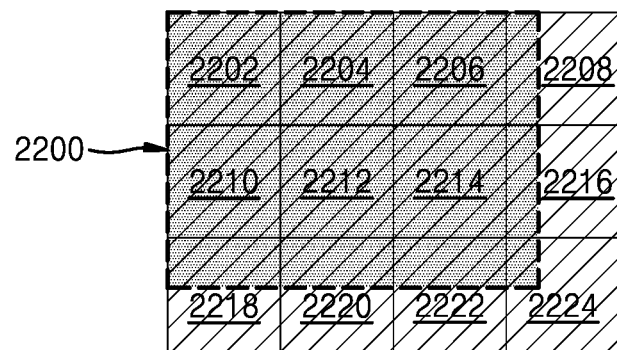
FIGS. 22A and 22B illustrate a method of determining a quantization parameter unit corresponding to a current block.
Figure 22B:
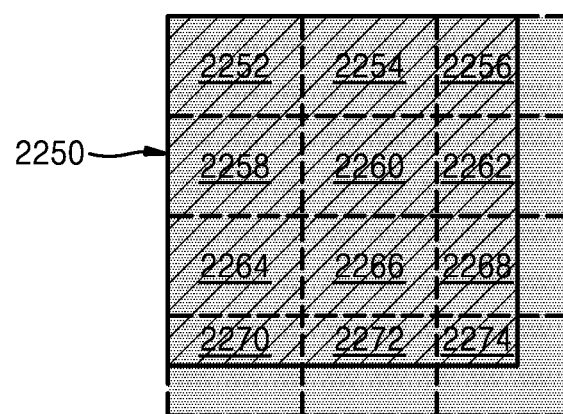

FIGS. 22A and 22B illustrate a method of determining a quantization parameter unit corresponding to a current block.

FIG. 22A illustrates an embodiment in which a quantization parameter unit 2200 corresponds to a plurality of coding blocks 2202 to 2224. Blocks 2202, 2204, 2206, 2210, 2212, and 2214 that are all included in the quantization parameter unit 2200 are inverse quantized according to a quantization parameter corresponding to the quantization parameter unit 2200.

Then, blocks whose parts are included in the quantization parameter unit 2200 may be determined with respect to whether a quantization parameter of the quantization parameter unit 2200 is to be applied thereto, based on an upper-left sample of a block. Therefore, blocks 2208, 2216, 2218, 2220, 2222, and 2224 whose upper-left samples are included in the quantization parameter unit 2200 may be inverse quantized according to the quantization parameter corresponding to the quantization parameter unit 2200.

In FIG. 22A, an embodiment in which a quantization parameter unit is determined based on an upper-left sample of a block is described, but, according to an embodiment, a quantization parameter unit of a block may be determined based on a center sample, an upper-right sample, a lower-left sample, a lower-right sample, or the like of the block.

FIG. 22B illustrates an embodiment in which a plurality of quantization parameter units 2252 to 2274 correspond to a block 2250.

The quantization parameter units 2252, 2254, 2258, 2260, 2264, and 2266 are entirely included in the block 2250. Therefore, the block 2250 may be inverse quantized according to at least one quantization parameter from among the quantization parameter units 2252, 2254, 2258, 2260, 2264, and 2266. For example, a quantization parameter of the block 2250 may be determined to be an average of quantization parameters of the quantization parameter units 2252, 2254, 2258, 2260, 2264, and 2266.

Alternatively, the quantization parameter units 2256, 2262, 2268, 2270, 2272, and 2274 that partly overlap with the block 2250 may be used to determine the quantization parameter of the block 2250. Therefore, the block 2250 may be inverse quantized according to a quantization parameter determined according to at least one of the quantization parameter units 2252 to 2274.

Figure 23A:
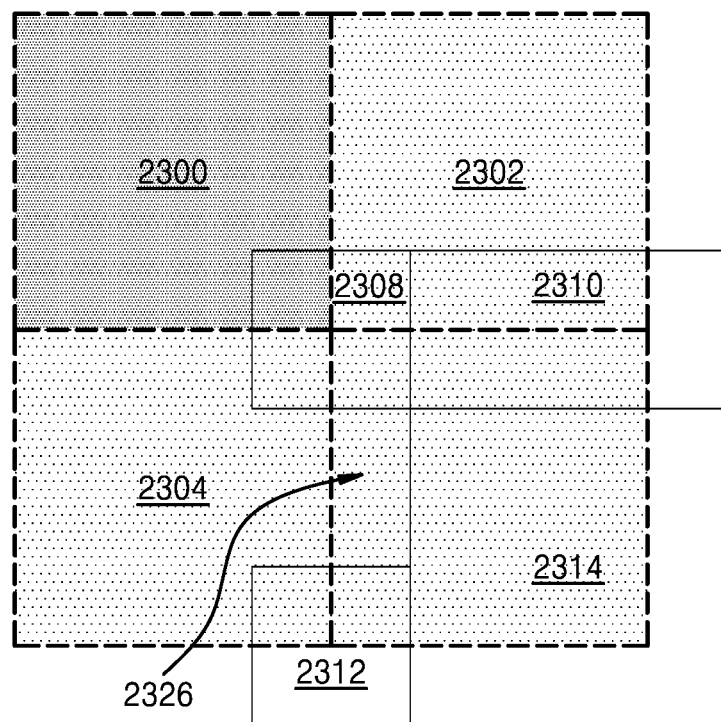
FIGS. 23A and 23B illustrate a correlation between a block and a quantization parameter unit.
Figure 23B:
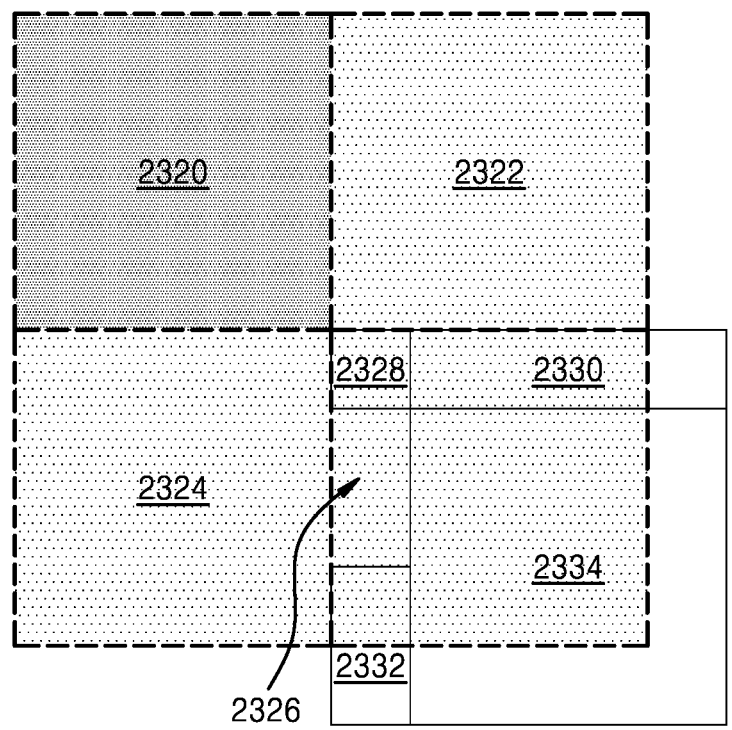

FIGS. 23A and 23B illustrate a correlation between a block and a quantization parameter unit.

FIG. 23A illustrates a block tree structure and a quantization parameter map, according to an embodiment. According to an embodiment, a quantization parameter unit corresponding to an upper-left sample of a block corresponds to the block. Therefore, a block 2308 corresponds to a quantization parameter unit 2300, a block 2310 corresponds to a quantization parameter unit 2302, a block 2312 corresponds to a quantization parameter unit 2304, and a block 2314 corresponds to a quantization parameter unit 2306. When correspondence references of a block and a quantization parameter unit are different, other quantization parameter units 2302, 2304, and 2306 may correspond to the block 2308.

FIG. 23B illustrates a block tree structure and a quantization parameter map, according to an embodiment. As in FIG. 23A, when a quantization parameter unit corresponding to an upper-left sample of a block corresponds to the block, all of blocks 2328, 2330, 2332, and 2334 correspond to a quantization parameter unit 2334. Because a quantization parameter of the quantization parameter unit 2334 is applied to all of the blocks 2328, 2330, 2332, and 2334, a quantization parameter is first calculated with respect to the block 2328 having an earliest decoding order. Then, the quantization parameter used for the block 2328 may be changelessly used for the blocks 2330, 2332, and 2334.

A quantization parameter is not determined for a block that does not have residual data. For example, when the block 2328 does not have residual data, inverse-quantization is not necessary for the block 2328, and thus, a quantization parameter of the block 2328 is not determined. When the block 2330 to be decoded after the block 2328 has residual data, a quantization parameter of the block 2330 may be determined. Then, the quantization parameter used for the block 2330 may be changelessly used for the blocks 2332 and 2334.

The quantization parameter determiner 1610 may obtain a predicted quantization parameter with respect to a current quantization parameter unit.

The quantization parameter determiner 1610 may obtain the predicted quantization parameter from at least one of a left quantization parameter unit of the current quantization parameter unit, an upper quantization parameter unit of the current quantization parameter unit, and a block decoded immediately before a current block.

Alternatively, the quantization parameter determiner 1610 may determine, as the predicted quantization parameter with respect to the current quantization parameter unit, a predicted quantization parameter with respect to a picture or slice including the current quantization parameter unit.

The quantization parameter determiner 1610 may obtain a difference quantization parameter with respect to the current quantization parameter unit.

The quantization parameter determiner 1610 may determine a quantization parameter of the current quantization parameter unit, based on the predicted quantization parameter and the difference quantization parameter.

The inverse-quantizer 1620 may inverse quantize the current block according to the quantization parameter of the current quantization parameter unit.

Figure 24:
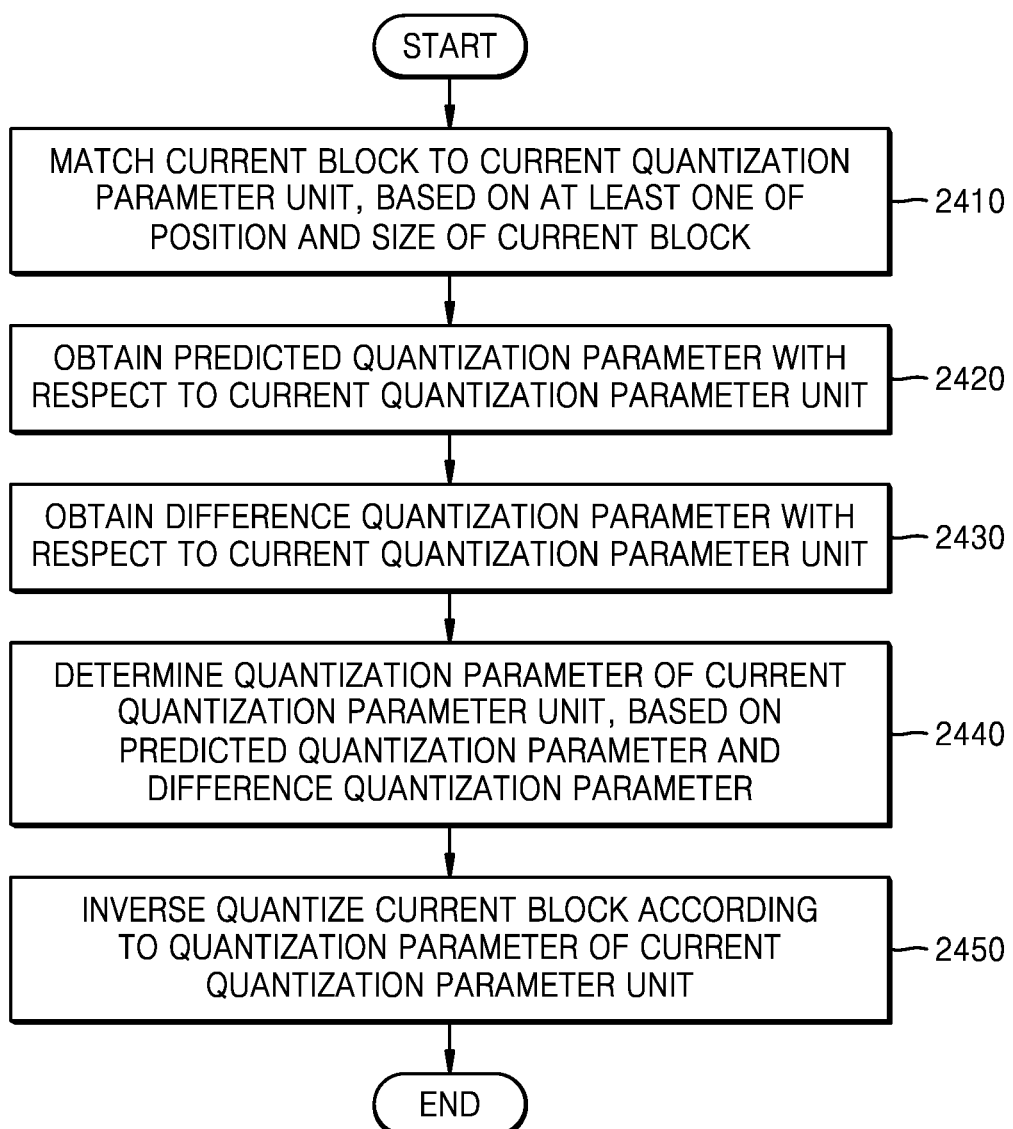
FIG. 24 illustrates an image decoding method of determining a quantization parameter of a block according to a quantization parameter unit, and decoding residual data of the block according to the determined quantization parameter.

FIG. 24 illustrates an image decoding method of determining a quantization parameter of a block according to a quantization parameter unit, and decoding residual data of the block according to the determined quantization parameter.

In operation 2410, a current block is matched to a current quantization parameter unit, based on at least one of a position and a size of the current block.

According to an embodiment, a quantization parameter unit including coordinate values of an upper-left sample of the current block may be determined as the current quantization parameter unit of the current block.

According to an embodiment, when the current block includes a plurality of quantization parameter units, the plurality of quantization parameter units may be determined as the current quantization parameter unit of the current block. In this regard, a current quantization parameter of the current block may be determined from at least one of the plurality of quantization parameter units.

In operation 2420, a predicted quantization parameter with respect to the current quantization parameter unit is obtained.

According to an embodiment, the predicted quantization parameter may be obtained from at least one of a left quantization parameter unit of the current quantization parameter unit, an upper quantization parameter unit of the current quantization parameter unit, and a block decoded immediately before the current block.

Alternatively, a predicted quantization parameter with respect to a picture or slice including the current quantization parameter unit may be determined as the predicted quantization parameter with respect to the current quantization parameter unit.

In operation 2430, a difference quantization parameter with respect to the current quantization parameter unit is obtained.

In operation 2440, a quantization parameter of the current quantization parameter unit is determined based on the predicted quantization parameter and the difference quantization parameter.

In operation 2450, the current block is inverse quantized according to the quantization parameter of the current quantization parameter unit.

The image decoding method of FIG. 24 may include various embodiments about a method of determining a quantization parameter according to a quantization group of the image decoding apparatus of FIG. 16.

Spatial-domain image data may be encoded for each of coding units of a tree structure by an image encoding technique based on the coding units of the tree structure and may be reconstructed by decoding each of largest coding units by an image decoding technique based on coding units of a tree structure as described above with reference to FIGS. 1 to 24, such that a picture and an image which is a picture sequence may be reconstructed. The reconstructed video may be reproduced by a reproducing device, may be stored in a storage medium, or may be transmitted via a network.

The above-described embodiments of the disclosure may be embodied as a computer executable program and implemented via a computer-readable recording medium by a general-purpose digital computer for execution of the program.

While the disclosure has been described above in connection with specific best embodiments, other disclosures derivable by making alternatives, modifications, and changes in the disclosure will be apparent to one of ordinary skill in the art, in view of the aforementioned descriptions. That is, the appended claims should be understood to cover all such alternatives, modifications and changes. Therefore, all the matters described in the present specification and illustrated in the drawings should be interpreted in an illustrative and non-limiting sense.

The invention claimed is:

1. An image decoding method comprising:
   splitting an upper coding block into a plurality of lower coding blocks according to split information;
   determining a current quantization group based on a split value of a current coding block among the plurality of lower coding blocks and a split value of the current quantization group;
   obtaining a quantization parameter of the current quantization group based on a predicted quantization parameter and a difference quantization parameter; and
   inverse-quantizing transform coefficients in a current transform block in the current coding block using the quantization parameter,
   wherein the difference quantization parameter is obtained using information regarding an absolute value of the difference quantization parameter and information regarding a sign of the difference quantization parameter, and
   wherein:
      the split value of the current coding block is increased by 1 if the current coding block is obtained by splitting the upper coding block into two lower coding blocks according to non-quadtree split, and
      the split value of the current coding block is increased by 2 if the current coding block is obtained by splitting the upper coding block into four lower coding blocks according to quadtree split.

2. An image decoding apparatus comprising:
   at least one processor configured to:
      split an upper coding block into a plurality of lower coding blocks according to split information;
      determine a current quantization group based on a split value of a current coding block among the plurality of lower coding blocks and a split value of the current quantization group;
      obtain a quantization parameter of the current quantization group based on a predicted quantization parameter and a difference quantization parameter; and
      inverse-quantize transform coefficients in a current transform block in the current coding block using the quantization parameter,
   wherein the difference quantization parameter is obtained using information regarding an absolute value of the difference quantization parameter and information regarding a sign of the difference quantization parameter, and wherein:
the split value of the current coding block is increased by 1 if the current coding block is obtained by splitting the upper coding block into two lower coding blocks according to non-quadtree split, and
the split value of the current coding block is increased by 2 if the current coding block is obtained by splitting the upper coding block into four lower coding blocks according to quadtree split.

3. An image encoding method comprising:
splitting an upper coding block into a plurality of lower coding blocks;
determining a current quantization group based on a split value of a current coding block among the plurality of lower coding blocks and a split value of the current quantization group;
obtaining a quantization parameter of the current quantization group; and
quantizing transform coefficients in a current transform block in the current coding block using the quantization parameter, wherein a difference quantization parameter is obtained based on the quantization parameter of the current quantization group and a predicted quantization parameter,
wherein information regarding an absolute value of the difference quantization parameter and information regarding a sign of the difference quantization parameter are obtained using the difference quantization parameter, and
wherein:
the split value of the current coding block is increased by 1 if the current coding block is obtained by splitting the upper coding block into two lower coding blocks according to non-quadtree split, and
the split value of the current coding block is increased by 2 if the current coding block is obtained by splitting the upper coding block into four lower coding blocks according to quadtree split.

4. A non-transitory storage medium storing data produced by the image encoding method of claim 3.

* * * * *